(12) United States Patent
Takayama et al.

(10) Patent No.: US 6,899,010 B2
(45) Date of Patent: May 31, 2005

(54) PNEUMATIC BOOSTER

(75) Inventors: Toshio Takayama, Yamanashi (JP); Mitsuhiro Endo, Yamanashi (JP); Tetsuya Takahashi, Yamanashi (JP); Shuzo Watanabe, Yamanashi (JP); Tadaaki Nakamura, Yamanashi (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 89 days.

(21) Appl. No.: 10/352,849

(22) Filed: Jan. 29, 2003

(65) Prior Publication Data
US 2004/0040808 A1 Mar. 4, 2004

(30) Foreign Application Priority Data

Jan. 31, 2002 (JP) ........................................ 2002-023524
May 31, 2002 (JP) ........................................ 2002-160113
Dec. 27, 2002 (JP) ........................................ 2002-380689

(51) Int. Cl.[7] ................................................ F15B 9/10
(52) U.S. Cl. .................................... 91/369.1; 91/376 R
(58) Field of Search ............................. 91/369.1, 369.2, 91/369.3, 376 R

(56) References Cited

U.S. PATENT DOCUMENTS

| 3,548,595 | A | * | 12/1970 | Spahn et al. | ................ | 91/369.3 |
| 5,699,713 | A | * | 12/1997 | Mortimer | ................... | 91/376 R |
| 6,044,750 | A | * | 4/2000 | Eick et al. | ................ | 91/376 R |
| 6,186,042 | B1 | * | 2/2001 | Levrai et al. | ............... | 91/369.2 |
| 6,205,905 | B1 | * | 3/2001 | Satoh et al. | ............... | 91/369.2 |
| 6,345,565 | B1 | * | 2/2002 | Tsubouchi et al. | ......... | 91/376 R |
| 6,422,124 | B1 | * | 7/2002 | Schonlau et al. | .......... | 91/369.3 |
| 6,494,125 | B2 | * | 12/2002 | Hannus et al. | ............. | 91/369.2 |
| 6,564,692 | B2 | * | 5/2003 | Inoue et al. | ............... | 91/369.3 |
| 6,575,077 | B2 | * | 6/2003 | Tsubouchi et al. | ......... | 91/369.1 |
| 6,584,833 | B1 | * | 7/2003 | Jamison et al. | ............ | 73/61.63 |
| 6,691,602 | B1 | * | 2/2004 | Harth et al. | ............... | 91/369.2 |
| 2002/0129697 | A1 | | 9/2002 | Machida et al. | | |

* cited by examiner

Primary Examiner—Edward K. Look
Assistant Examiner—Igor Kershteyn
(74) Attorney, Agent, or Firm—Wenderoth, Lind & Ponack, L.L.P.

(57) ABSTRACT

A valve body 2 is connected to a power piston, which divides a housing into a constant pressure chamber (negative pressure) and a variable pressure chamber. In the valve body 2, there is provided a brake assisting mechanism 10 between a reaction disk 3 and a plunger 9. A poppet seal 12 is opened by movement of the plunger 9, to thereby introduce atmospheric air into the variable pressure chamber and generate a thrust force in the power piston. During rapid braking, a plunger rod 23 advances relative to a sleeve 21, and balls 30 shift outward and the plunger rod 23 directly abuts against a reaction rod 22, resulting in contraction of the brake assisting mechanism 10. Therefore, the amount of movement of the plunger 9 can be increased without being affected by a reaction force from the reaction disk 3, thus enabling rapid development of servo power.

21 Claims, 27 Drawing Sheets

PNEUMATIC BOOSTER

BACKGROUND OF THE INVENTION

The present invention relates to a pneumatic booster attached to a brake apparatus for a vehicle, such as an automobile.

In general, a pneumatic booster is attached to a brake apparatus for an automobile, so as to generate a large braking force. As a pneumatic booster, generally, there has been known a pneumatic booster in which a housing is divided, by means of a power piston, into a constant pressure chamber (which is maintained at negative pressure under an intake pressure of an engine) and a variable pressure chamber. A valve body is connected to the power piston, and a plunger provided inside the valve body is moved by means of an input rod, to thereby introduce atmospheric air (positive pressure) into the variable pressure chamber, thus generating a pressure differential between the constant pressure chamber and the variable pressure chamber. A thrust force generated in the power piston due to the pressure differential is applied through a reaction member to an output rod. A reaction force of the output rod applied to the reaction member is partly transmitted to the input rod.

With respect to a pneumatic booster of this type, the relationship between an input force (a pedaling force acting on a brake pedal) and an output force (a braking force) is as indicated by a solid line in FIG. 27. As shown in FIG. 27, in an initial stage of a braking operation, a "jump-in" output A is generated due to the existence of a gap between the plunger and the reaction member. Thereafter, the output force increases linearly in proportion to the input force and reaches a full-load point B.

Needless to say, in the above-mentioned conventional pneumatic booster in which a braking force linearly increases in proportion to a pedaling force, a large pedaling force is required to generate a sufficiently large braking force in the event of an emergency. Therefore, to reduce a pedaling force required to generate a large braking force in the event of an emergency, a pneumatic booster comprising a so-called brake assisting mechanism is desirably employed. A pneumatic booster comprising a brake assisting mechanism, in combination with an anti-lock brake apparatus which prevents wheel lock during braking, remarkably improves a braking ability in the event of an emergency.

A pneumatic booster comprising a brake assisting mechanism is disclosed in, for example, Unexamined Japanese Patent Application Public Disclosure No. 2000-25603. In this pneumatic booster, a plunger associated with a spring is employed so that the plunger changes its effective length under expansion and compression of the spring. In the event of an emergency where a pedaling force acting on a brake pedal exceeds a predetermined level, the spring is compressed, and the plunger is displaced by a large amount relative to a valve body. Thus, a boosting ratio rapidly increases as is indicated by a portion C in FIG. 27, and a large braking force is generated.

In view of the above, the present invention has been made. It is an object of the present invention to provide a pneumatic booster having a simple structure, which is capable of rapidly developing an output force in the event of an emergency, so that a desired braking force can be reliably generated.

SUMMARY OF THE INVENTION

In order to achieve the above-mentioned object, the present invention provides a pneumatic booster in which a housing is divided into a constant pressure chamber and a variable pressure chamber by a power piston, the power piston being connected to a valve body, and a plunger provided inside the valve body is moved by an input rod, to thereby open a valve means to introduce a working fluid into the variable pressure chamber, thus generating a pressure differential between the constant pressure chamber and the variable pressure chamber, whereby a thrust force generated in the power piston due to the pressure differential is applied through a reaction member to an output rod, and a reaction force of the output rod applied to the reaction member is partly transmitted to the input rod, wherein a contractible brake assisting mechanism is provided between the plunger and the reaction member, the brake assisting mechanism being adapted to contract when a speed or an amount of movement of the plunger relative to the valve body reaches a predetermined level.

With this arrangement, when an input force is applied to the input rod at a high rate, the speed of the plunger moved by the input rod and the speed of the valve body moved by a thrust force of the power piston become different. Due to a difference in speed between the plunger and the valve body, an amount of movement of the plunger relative to the valve body reaches a predetermined level, resulting in contraction of the brake assisting mechanism. Consequently, the amount of movement of the plunger further increases, thus increasing the degree of opening of the valve means.

In the pneumatic booster of the present invention, the brake assisting mechanism may comprise:

a sleeve slidably guided into the valve body;

a plunger rod inserted into the sleeve and connected to the plunger;

a reaction rod inserted into the sleeve so as to face the reaction member; and balls provided between the plunger rod and the reaction rod inside the sleeve, whereby when the speed or the amount of movement of the plunger relative to the valve body reaches the predetermined level, due to relative movement between the sleeve and the plunger rod, the balls shift from a position between the reaction rod and the plunger rod in a radial direction of the plunger rod, to thereby move the reaction rod and the plunger rod towards each other.

With this arrangement, when the speed or amount of movement of the plunger relative to the valve body reaches the predetermined level, the balls shift from a position between the reaction rod and the plunger rod due to relative movement between the sleeve and the plunger rod. Consequently, the reaction rod and the plunger rod move towards each other, thus contracting the brake assisting mechanism.

In the pneumatic booster of the present invention, the brake assisting mechanism may comprise:

a reaction rod facing the reaction member;

an elastic member provided between the reaction rod and the plunger; and a control means adapted to normally limit compression of the elastic member in a direction of movement of the plunger, and permits compression of the elastic member in the direction of movement of the plunger when the speed or the amount of movement of the plunger relative to the valve body reaches the predetermined level.

With this arrangement, when the speed or amount of movement of the plunger relative to the valve body reaches the predetermined level, compression of the elastic member is permitted by using the control means, and contraction of the brake assisting mechanism is effected by compression of the elastic member.

The control means may comprise a sleeve slidably provided on an outer circumferential surface of the elastic member, the sleeve including a groove formed in an inner circumferential surface thereof, the groove being adapted to accommodate a diametrically expanded portion of the elastic member, which is formed as the elastic member is compressed in the direction of movement of the plunger when the speed or the amount of movement of the plunger relative to the valve body reaches the predetermined level.

The sleeve may be biased towards the reaction disk by means of a bias member provided between the sleeve and the plunger, and engage the reaction rod, and the sleeve may be adapted to abut against the valve body-when the speed or the amount of movement of the plunger relative to the valve body reaches the predetermined level.

The bias member may engage a holder provided separately from the plunger and provided in contact with the plunger, and a connecting member may be provided so as to connect the holder, the elastic member and the reaction rod in a manner such that a region between the holder and the reaction rod is contractible.

The pneumatic booster of the present invention may be arranged, such that a pressure-receiving surface of the valve body relative to the reaction member includes a recess, and an area of the pressure-receiving surface of the valve body relative to the reaction member is increased by allowing expansion of the reaction member into the recess.

In the pneumatic booster of the present invention, a reaction plate may be provided so as to transmit the reaction force from the reaction member towards the input rod, whereby when the reaction force from the reaction member becomes large, the reaction plate abuts against the valve body and transmits the reaction force from the reaction member to the valve body.

The present invention also provides a pneumatic booster in which a housing is divided into a constant pressure chamber and a variable pressure chamber by a power piston, the power piston being connected to a valve body, and a plunger provided inside the valve body is moved by an input rod, to thereby open a valve means to introduce a working fluid into the variable pressure chamber, thus generating a pressure differential between the constant pressure chamber and the variable pressure chamber, whereby a thrust force generated in the power piston due to the pressure differential is applied through a reaction member to an output rod, and a reaction force of the output rod applied to the reaction member is partly transmitted to the input rod, wherein a brake assisting mechanism is provided so as to move a valve body of the valve means in a valve-opening direction when a speed or an amount of movement of the plunger relative to the valve body reaches a predetermined level.

With this arrangement, when an input force is applied to the input rod at a high rate, the speed of the plunger moved by the input rod and the speed of the valve body moved by a thrust force of the power piston become different. Due to a difference in speed between the plunger and the valve body, an amount of movement of the plunger relative to the valve body reaches a predetermined level, and the valve body is moved in a valve-opening direction by the brake assisting mechanism, thus increasing the degree of opening of the valve means.

Hereinbelow, the present invention is described in detail, with reference to embodiments shown in the drawings.

DETAILED DESCRIPTION OF THE INVENTION

Hereinbelow, description is made in detail with regard to embodiments of the present invention, referring to the accompanying drawings.

Figure 1:
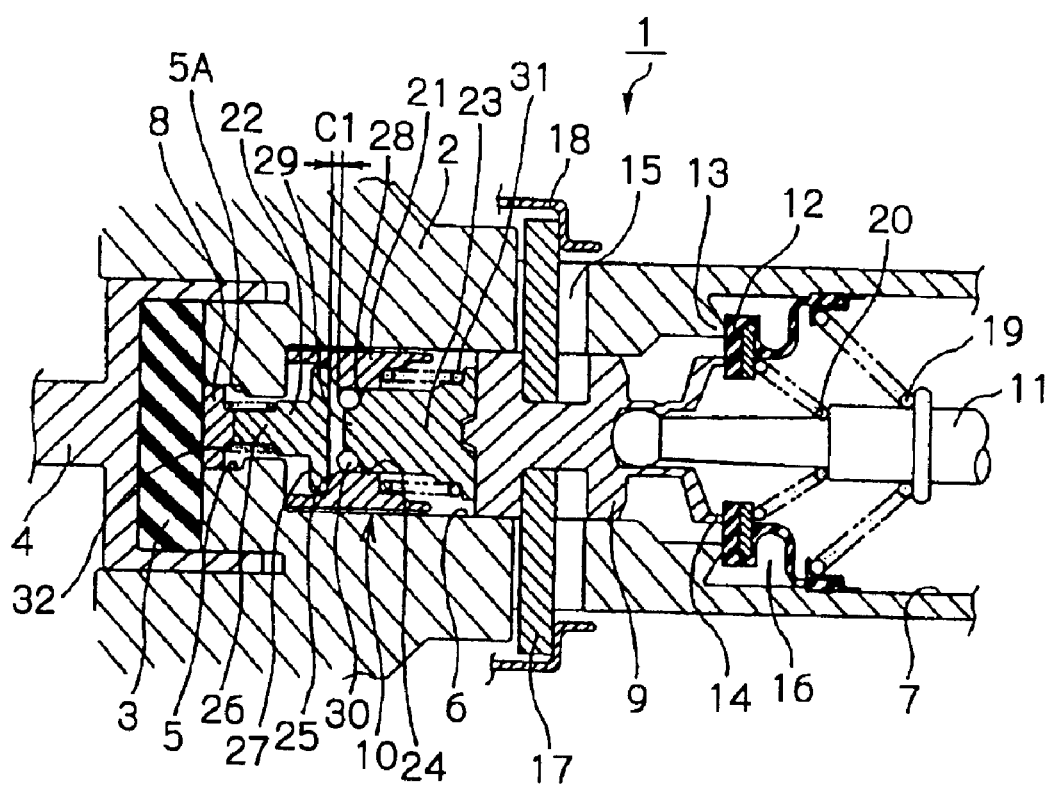
FIG. 1 shows a longitudinal section of an essential part of a pneumatic booster according to a first embodiment of the present invention.

First, a first embodiment of the present invention is described, referring to FIGS. 1 to 4 and FIG. 7. FIG. 1 shows an inside of a valve body 2, which is an essential part of a pneumatic booster 1 in this embodiment. As is the case with the above-mentioned conventional pneumatic booster, the pneumatic booster 1 comprises a housing (not shown) divided into a constant pressure chamber and a variable pressure chamber by a power piston. The valve body 2, which is in a generally cylindrical form, has one end portion connected to the power piston. The other end portion of the valve body 2 is slidably and gas-tightly inserted through a rear wall of the housing and extends to the outside. The one end portion of the valve body 2 is also connected to an output rod 4 through a reaction disk 3 (a reaction member). A forward end portion of the output rod 4 is connected to a piston provided in a master cylinder (not shown) attached to a front wall of the housing.

The inside of the valve body 2 has a stepped configuration which is provided by forming therein a small-diameter bore 5, an intermediate-diameter bore 6 and a large-diameter bore 7. A ratio plate 8 in contact with the reaction disk 3 slidably fits in the small-diameter bore 5. The small-diameter bore 5 includes a stepped portion 5A for limiting an amount of rearward movement of the ratio plate 8 to prevent excessive deformation of the reaction disk 3. A plunger 9 slidably fits in the intermediate-diameter bore 6, and a brake assisting mechanism 10 is provided between the plunger 9 and the ratio plate 8. One end portion of an input rod 11 is connected to the plunger 9. The other end portion of the input rod 11 is inserted through a gas-permeable dust seal (not shown) attached to the end portion of the valve body 2, and extends to the outside.

A poppet seal 12 (a valve means) is attached to the large-diameter bore 7 of the valve body 2. A seat portion 13 formed at a stepped portion between the intermediate-diameter bore 6 and the large-diameter bore 7 of the valve body 2 and a seat portion 14 formed at a rear end portion of the plunger 9 are seated against the poppet seal 12. The intermediate-diameter bore 6 of the valve body 2 is communicated with the variable pressure chamber in the housing through a passage 15 formed in a side wall of the valve body 2. An inside of the poppet seal 12 in the large-diameter bore 7 is open to the atmosphere through the dust seal. A space 16 formed outside the poppet seal 12 in the large-diameter bore 7 is communicated with the constant pressure chamber in the housing through a passage (not shown) formed in the side wall of the valve body 2.

With this arrangement, the seat portion 14 of the plunger 9 is separated from or seated against the poppet seal 12, to thereby allow or prevent communication between the variable pressure chamber and the atmosphere. The seat portion 13 of the valve body 2 is separated from or seated against the poppet seal 12, to thereby allow or prevent communication between the constant pressure chamber and the variable pressure chamber.

A stop key 17 extends through the passage 15 of the valve body 2. The stop key 17 is adapted to engage the plunger 9 and a stop ring 18 fixed to the housing, thus limiting a retracted position of the valve body 2 and an amount of movement of the valve body 2 relative to the plunger 9. In FIG. 1, reference numeral 19 denotes a return spring for the input rod 11. Reference numeral 20 denotes a poppet spring. The poppet seal 12 is capable of acting as a valve seat due to a force exerted by the poppet spring 20.

Next, description is made with regard to the brake assisting mechanism 10 as an essential part of the pneumatic booster in this embodiment.

The brake assisting mechanism 10 comprises a cylindrical sleeve 21 slidably fitted into the intermediate-diameter bore 6 of the valve body 2, a reaction rod 22 in contact with the ratio plate 8 and a plunger rod 23 in contact with the plunger 9. The sleeve 21 includes an inwardly protruding small-diameter guide portion 24. A taper portion 25 is formed at an edge of an inner circumferential surface of one end of the guide portion 24.

A small-diameter protruding portion 26 of the reaction rod 22 is inserted into the small-diameter bore 5 of the valve body 2, and abuts against the ratio plate 8. A large-diameter flange portion 27 of the reaction rod 22 is inserted into the sleeve 21 and abuts against an end face of the guide portion 24 in which the taper portion 25 is formed.

The plunger rod 23 is slidably inserted into the guide portion 24 of the sleeve 21. A taper portion 28 is formed at an edge of an outer circumferential surface of an end of the plunger rod 23. A protruding portion 29 is formed at a forward end of the taper portion 28. A plurality of balls 30 (steel balls) are provided in an annular space formed between the outer circumferential surface of the protruding portion 29 and the inner circumferential surface of the guide portion 24 of the sleeve 21.

Figure 2:
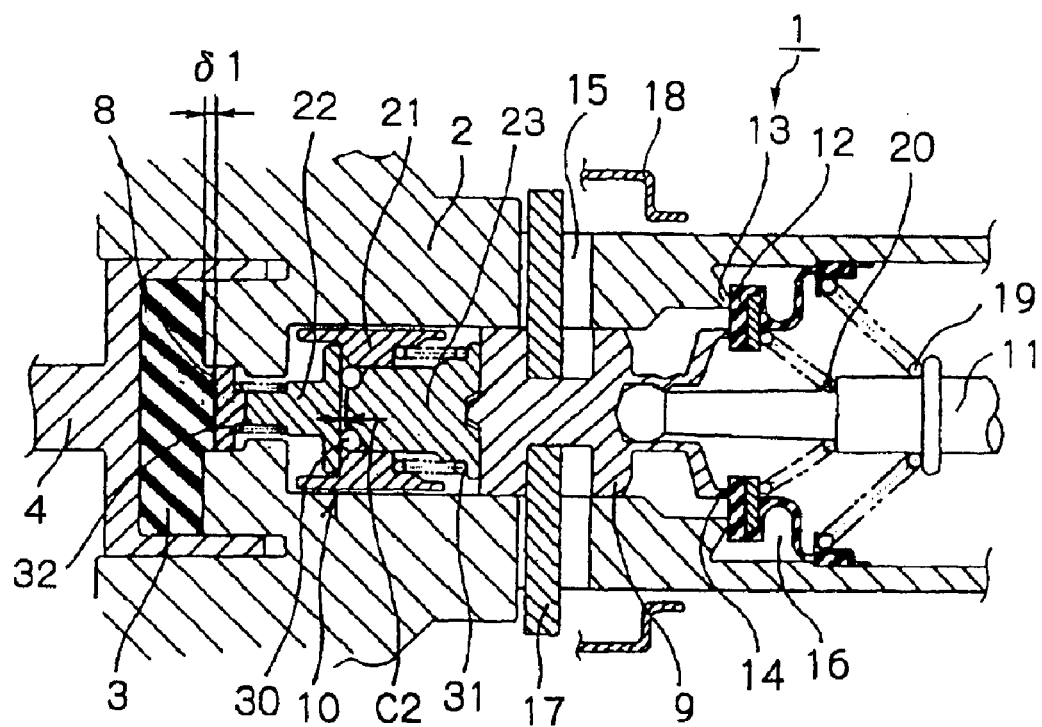
FIG. 2 shows how servo power is generated in the pneumatic booster of FIG. 1, due to a "jump-in" effect during normal braking.

In a non-braking position shown in FIG. 1, a predetermined clearance C1 is formed between the reaction rod 22 and the balls 30. Further, as shown in FIG. 2, when the plunger rod 23 advances in the guide portion 24 of the sleeve 21 and the balls 30 abut against the reaction rod 22, a clearance C2 is formed between the protruding portion 29 and the reaction rod 22.

Figure 3:
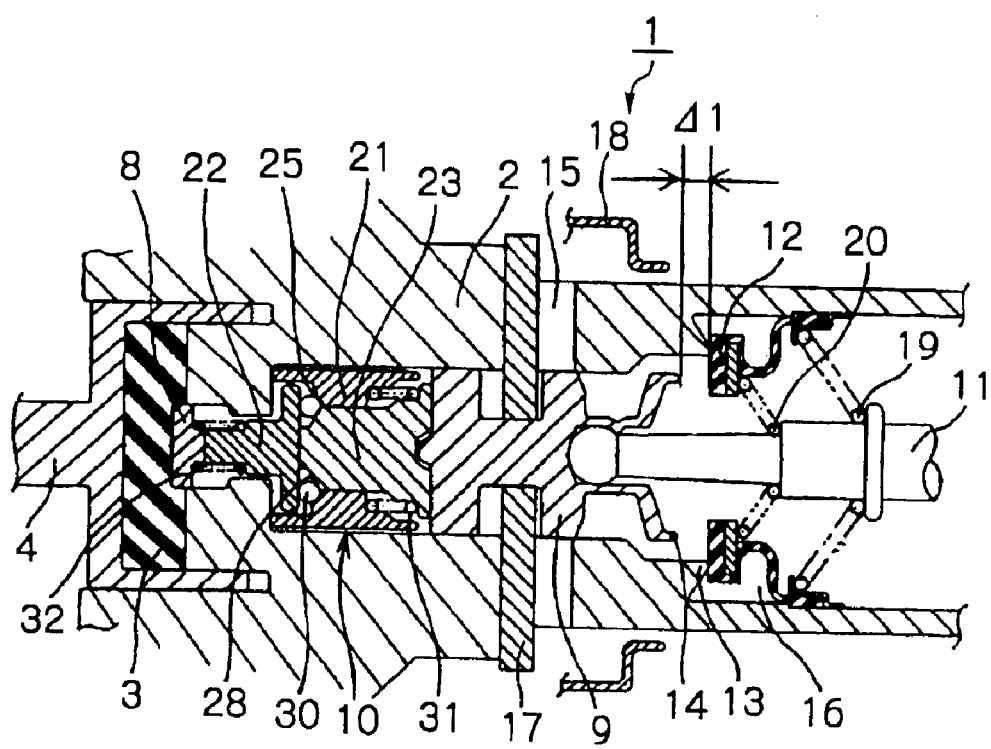
FIG. 3 shows a state of the pneumatic booster of FIG. 1 during rapid braking.

Further, as shown in FIG. 3, when the plunger rod 23 moves forward relative to the sleeve 21 and the taper portions 28 and 25 are brought into register, the balls 30 shift outwardly along the taper portion 28, and a forward end of the protruding portion 29 directly abuts against the reaction rod 22.

A spring 31 (a compression spring) is provided between an end of the guide portion 24 of the sleeve 21 and a flange portion formed at an end portion of the plunger rod 23. A retaining spring 32 (a compression spring) is provided between the reaction rod 22 and the ratio plate 8, so as to stabilize a position of the reaction rod 22. A spring force of the spring 32 is smaller than that of the spring 31.

The pneumatic booster in this embodiment is arranged in the above-mentioned manner. An operation of this pneumatic booster is explained below.

In the non-braking position shown in FIG. 1, the seat portion 13 of the valve body 2 and the seat portion 14 of the plunger 9 are seated against the poppet seal 12, thus preventing communication between the variable pressure chamber and the constant pressure chamber (maintained at negative pressure under an intake pressure of an engine), and between the variable pressure chamber and the atmosphere (a working fluid). The pressure in the variable pressure chamber and the pressure in the constant pressure chamber acting on the power piston are balanced. Therefore, no thrust force is generated in the power piston.

When a driver conducts a normal braking operation, the input rod 11 is pressed, to thereby move the plunger 9 in a forward direction. The seat portion 14 of the plunger 9 is separated from the poppet seal 12, to thereby introduce atmospheric air (positive pressure) into the variable pressure chamber. Consequently, a pressure differential is generated between the constant pressure chamber and the variable pressure chamber, and a thrust force is generated in the power piston, so that the valve body 2 moves while pressing the output rod 4 through the reaction disk 3, to thereby generate servo power. As the valve body 2 is moved by the thrust force of the power piston and follows the plunger 9, the seat portion 14 is seated against the poppet seal 12, to thereby stop the introduction of atmospheric air into the variable pressure chamber and maintain the pressure differential between the constant pressure chamber and the variable pressure chamber.

In this instance, the sleeve 21 moves with the valve body 2 under a bias force of the spring 31, and follows the plunger rod 23 which moves with the plunger 9. Therefore, the balls 30 are retained in the annular space formed between the outer circumferential surface of the protruding portion 29 of the plunger rod 23 and the inner circumferential surface of the guide portion 24 of the sleeve 21. A reaction force of the output rod 4 acting on the reaction disk 3 is partly transmitted to the ratio plate 8, and further transmitted through the reaction rod 22, the balls 30, the plunger rod 23 and the plunger 9 to the input rod 11. Thus, servo power corresponding to a pedaling force acting on the brake pedal can be generated.

In an initial stage of the braking operation, due to the clearance C1 between the reaction rod 22 and the balls 30, the plunger rod 23 and the plunger 9 can be moved, without receiving a reaction force from the reaction disk 3. Therefore, a braking force can be rapidly developed (a "jump-in" effect). FIG. 2 shows how servo power is generated due to this "jump-in" effect. In the state shown in FIG. 2, the plunger rod 23 abuts against the reaction rod 22 through the balls 30, and the reaction disk 3 is compressed by $\delta1$ (a "jump-in" clearance), by means of the valve body 2.

Figure 7:
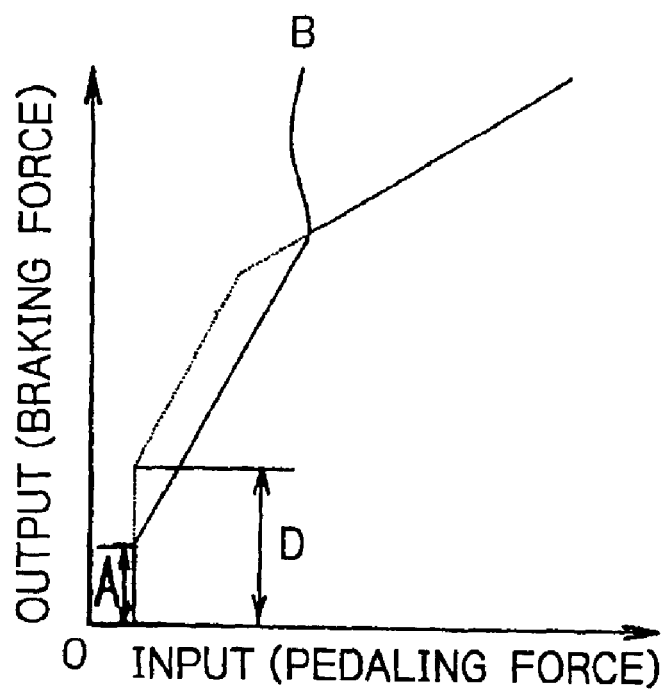
FIG. 7 is a graph indicating the relationship between an input force and an output force in the pneumatic booster in the first embodiment of the present invention.

Therefore, the relationship between an input force applied to the input rod 11 (a pedaling force) and an output force of the output rod 4 (a braking force) as indicated by a solid line in FIG. 7 is established. That is, a "jump-in" output A is generated in an initial stage of a braking operation. Thereafter, the output force increases linearly in proportion to the input force and reaches a full-load point B.

When the pedaling force applied to the input rod 11 is released, the seat portion 14 of the plunger 9 moves the poppet seal 12 in a rearward direction, to thereby separate the poppet seal 12 from the seat portion 13 of the valve body 2. Consequently, air in the variable pressure chamber flows into the constant pressure chamber, thus eliminating the pressure differential between the constant pressure chamber and the variable pressure chamber, and the thrust force of the power piston is lost. Consequently, the valve body 2 retracts and returns to the non-braking position shown in FIG. 1, thus releasing the braking force.

During rapid braking, that is, when a driver quickly depresses the brake pedal, the speed of the plunger 9 moved by a pedaling force applied to the input rod 11 and the speed of the valve body 2 moved by a thrust force of the power piston become different. Due to a difference in speed between the plunger 9 and the valve body 2, the movement of the valve body 2 which follows the plunger 9 is delayed, and the sleeve 21 abuts against an end face of the intermediate-diameter bore 6 of the valve body 2. As a result, the spring 31 is compressed and the plunger rod 23 advances relative to the sleeve 21, so that the taper portion 28 of the plunger rod 23 and the taper portion 25 of the sleeve 21 are brought into register. Consequently, the balls 30 shift outward to the taper portion 25, and the protruding portion 29 of the plunger rod 23 directly abuts against the reaction rod 22. Thus, the brake assisting mechanism 10 contracts.

Figure 4:
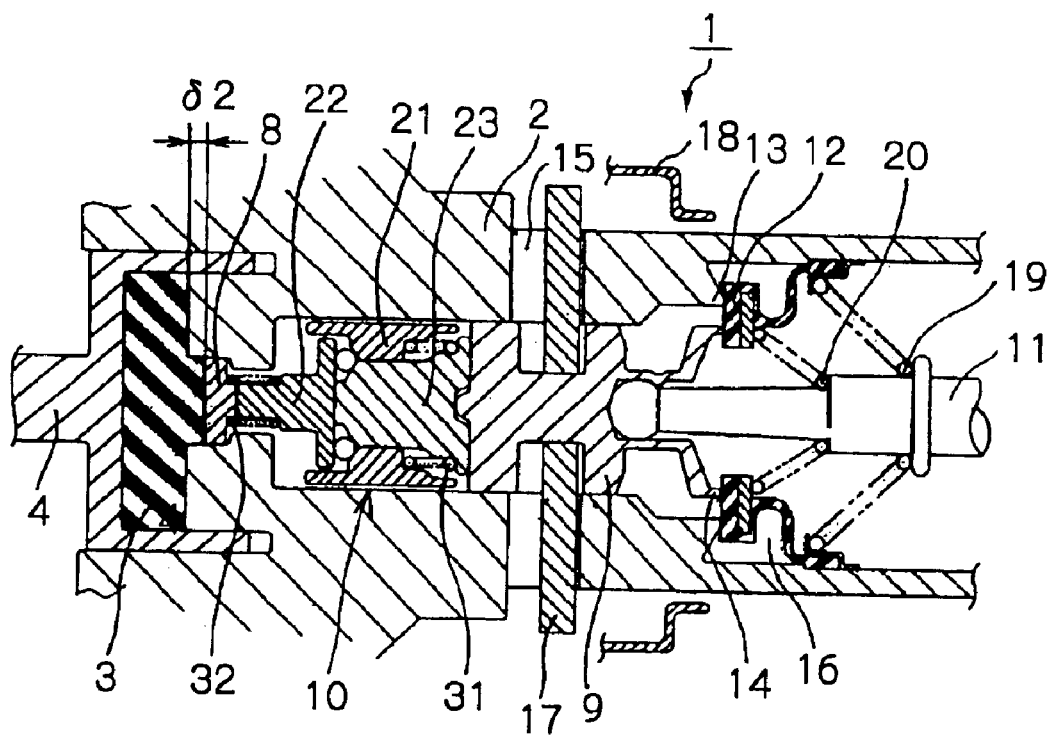
FIG. 4 shows how servo power is generated in the pneumatic booster of FIG. 1, due to a "jump-in" effect during rapid braking.

Thus, as shown in FIG. 3, the plunger 9 can be further moved in a forward direction without increasing a reaction force from the reaction disk 3, and consequently a degree $\Delta1$ of opening between the seat portion 14 of the plunger 9 and the poppet seal 12 can be increased, to thereby introduce a large amount of atmospheric air into the variable pressure chamber. As a result, a high pressure differential is generated between the constant pressure chamber and the variable pressure chamber. Under the action of a thrust force generated in the power piston due to this pressure differential, the valve body 2 advances as shown in FIG. 4, and imparts servo power to the output rod 4. In this instance, the plunger rod 23 is in direct contact with the reaction rod 22, and the reaction disk 3 is compressed, by means of the valve body 2, by a "jump-in" clearance $\delta2$ ($\delta2=\delta1+C2$) larger than $\delta1$. Thus, as indicated by a dotted line in FIG. 7, a high "jump-in" output D can be generated, thus markedly increasing the braking force.

In this state, when the pedaling force applied to the input rod 11 is released, as in the case of normal braking described above, the valve body 2 retracts and the braking force is released. Further, as the plunger 9 and the input rod 11 retract, the plunger rod 23 is moved rearwardly relative to the sleeve 21 under the action of force of the spring 31, and the balls 30 are returned to their initial position shown in FIG. 1.

Thus, during rapid braking, a high "jump-in" output can be generated. Therefore, a large braking force can be rapidly generated while reducing a required pedaling force, thus improving a braking ability in the event of an emergency.

Figure 5:
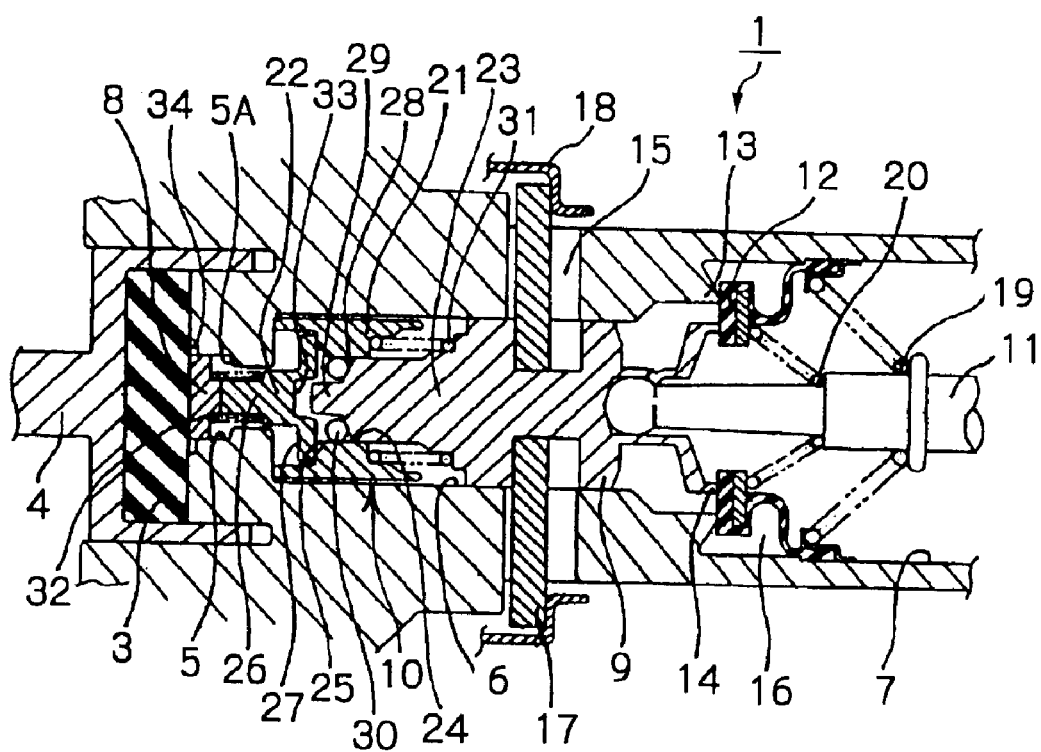
FIG. 5 shows a longitudinal section of an essential part of a pneumatic booster according to a first modified example of the first embodiment of the present invention.
Figure 6:
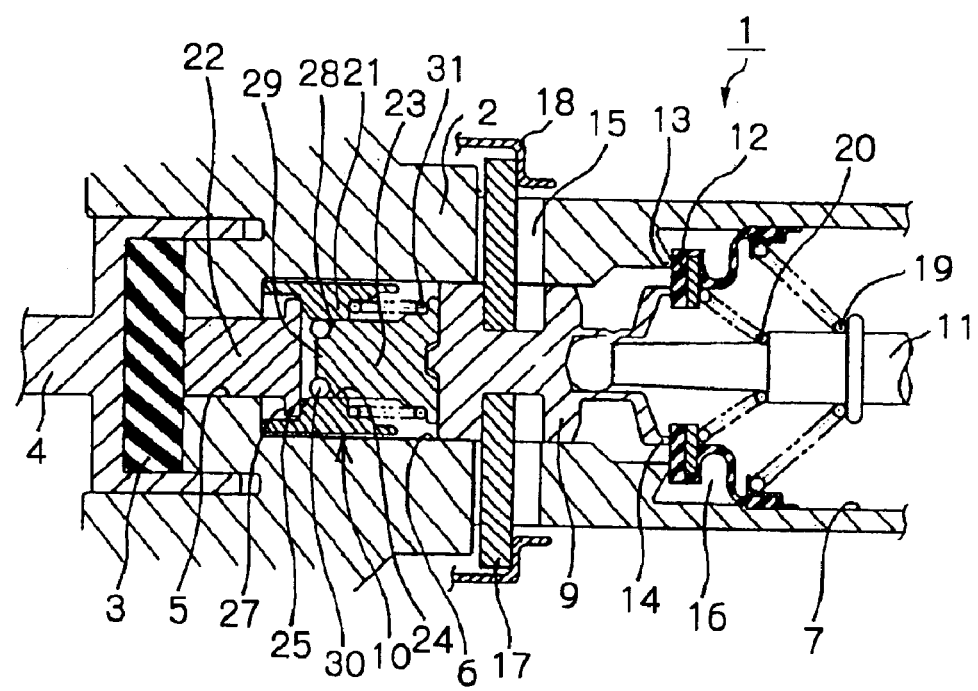
FIG. 6 shows a longitudinal section of an essential part of a pneumatic booster according to a second modified example of the first embodiment of the present invention.

Next, referring to FIGS. 5 and 6, description is made with regard to modified examples of the first embodiment. In the following description of these modified examples, the same portions as those in the above first embodiment are designated by the same reference numerals and characters as used in the first embodiment. Only portions that are different from those in the first embodiment are described in detail.

In a first modified example shown in FIG. 5, the plunger rod 23 is formed integrally with the plunger 9. Further, the length of protrusion of the protruding portion 29 of the plunger rod 23 is increased, and a recess 33 for accommodating a forward end portion of the protruding portion 29 is formed in the reaction rod 22. Since the plunger rod 23 and the plunger 9 are formed integrally with each other, the number of parts can be reduced. Further, since the length of protrusion of the protruding portion 29 is large, the position of the balls 30 retained in the non-braking position can be stabilized. Incidentally, the pneumatic booster in this modified example is a so-called 2-ratio type having a 2-stage boosting ratio, in which a relieving portion 34 is formed at an edge of an inner circumferential surface of the small-diameter bore 5 of the valve body 2, so as to accommodate the reaction disk 3 pressed by the valve body 2.

In a second modified example shown in FIG. 6, the ratio plate 8 and the reaction rod 22 are formed integrally with each other, and a mechanism for preventing excessive deformation of the reaction disk 3 is eliminated. As is the case with the first modified example, the plunger rod 23 may be formed integrally with the plunger 8.

Next, referring to FIGS. 8 to 11, description is made with regard to a second embodiment of the present invention. In the following description of the second embodiment, the same portions as those in the first embodiment (the second modified example shown in FIG. 6) are designated by the same reference numerals and characters as used in the first embodiment. Only portions that are different from those in the first embodiment are described in detail.

Figure 8:
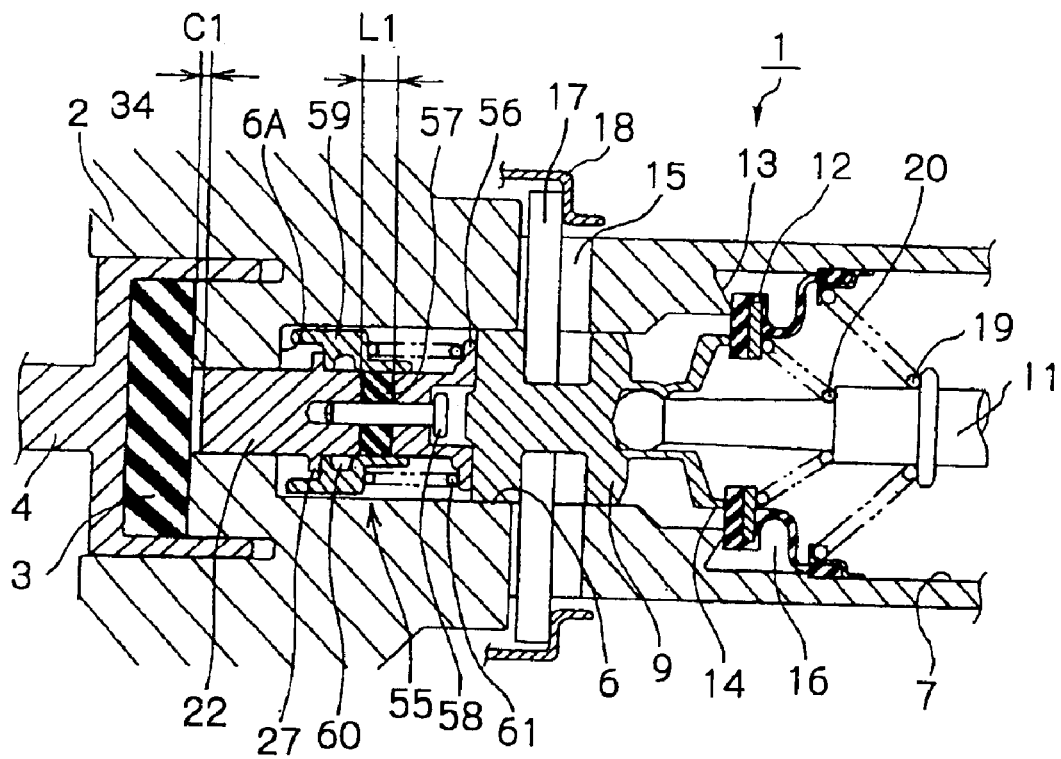
FIG. 8 shows a longitudinal section of an essential part of a pneumatic booster according to a second embodiment of the present invention.

This embodiment shown in FIG. 8 differs from the second modified example of the first embodiment of FIG. 6, in that a brake assisting mechanism 55 is provided, instead of the brake assisting mechanism 10. In the brake assisting mechanism 55, a holder 56 in contact with the plunger 9 is connected to the reaction rod 22 by means of a pin 58, with an elastic member 57 being provided between the holder 56 and the reaction rod 22. The reaction rod 22, the holder 56 and the elastic member 57 have the same diameter, and a generally cylindrical sleeve 59 is slidably fitted over these elements. The pin 58 is slidably inserted through the holder 56, and the brake assisting mechanism 55 is made axially contractible due to elasticity of the elastic member 57.

The sleeve 59 includes an inner circumferential groove 60. A spring 61 is provided between the holder 56 and the sleeve 59. Under a spring force of the spring 61, the sleeve 59 is biased towards the output rod 4, and abuts against the flange portion 27 of the reaction rod 22. In this state, an inner circumferential surface of the sleeve 59 abuts against the elastic member 57. When the sleeve 59 moves towards the input rod 11, the inner circumferential groove 60 of the sleeve 59 is positioned such that it faces the elastic member 57. A predetermined gap is provided between an end portion of the sleeve 59 and an end face 6A of the intermediate-diameter bore 6 of the valve body 2. The reaction rod 22, the holder 56, the elastic member 57 and the spring 61 can be subassembled by connecting the reaction rod 22 and the holder 56 by means of the pin 58.

The pneumatic booster in the second embodiment is arranged in the above-mentioned manner. An operation of this pneumatic booster is described below.

Figure 9:
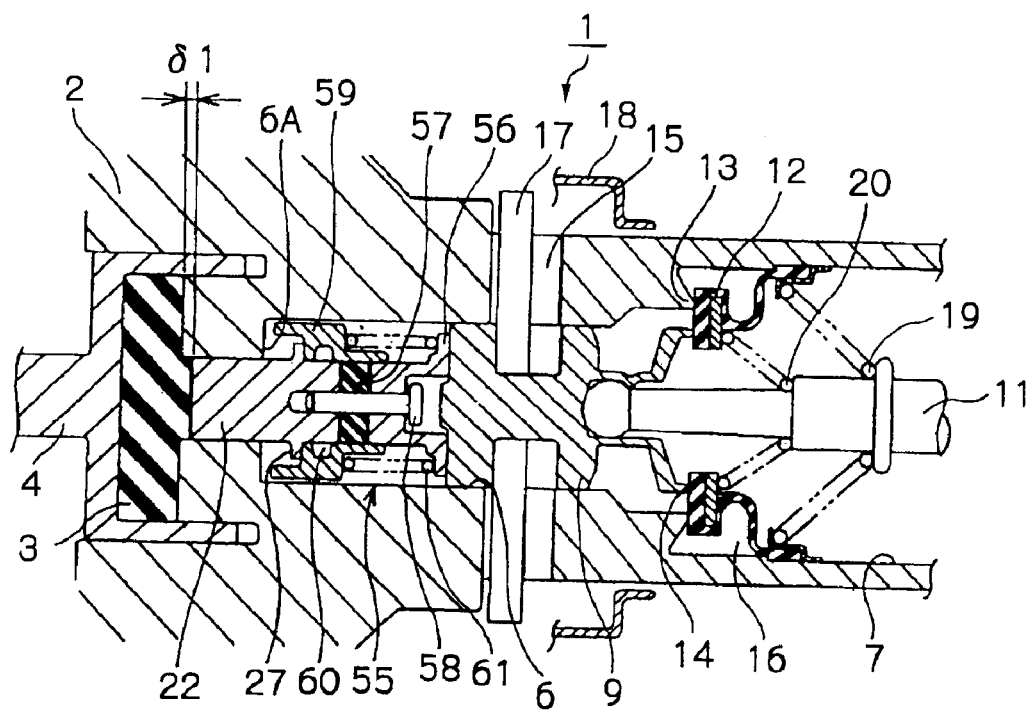
FIG. 9 shows how servo power is generated in the pneumatic booster of FIG. 8, due to a "jump-in" effect during normal braking.

During normal braking, the sleeve 59 is located at a position such that it abuts against the flange portion 27 of the reaction rod 22, under a spring force of the spring 61. The elastic member 57 is contained in a space sealed by the inner circumferential surface of the sleeve 59. In this state, a reduction in an axial dimension L1 of the elastic member 57 resulting from compression of the elastic member 57 depends on volume elasticity of the elastic member 57. Therefore, the modulus of elasticity of the elastic member 57 is high, so that an axial dimension of the brake assisting mechanism 55 is substantially unchanged. Therefore, as is the case with the first embodiment, atmospheric air is introduced into the variable pressure chamber by movement of the plunger 9 due to the input rod 11, and a thrust force generated in the power piston due to a pressure differential between the constant pressure chamber and the variable pressure chamber is applied through the reaction disk 3 to the output rod 4, to thereby generate servo power. A reaction force from the output rod 4 acting on the reaction disk 3 is partly transmitted through the reaction rod 22 and the elastic member 57 to the input rod 11. In an initial stage of a braking operation, a "jump-in" effect is obtained due to the clearance C1 between the reaction disk 3 and the reaction rod 22. FIG. 9 shows how servo power is generated due to the "jump-in" effect.

With this arrangement, the relationship between an input force (a pedaling force) applied to the input rod 11 and an output force (a braking force) of the output rod 4 as indicated by the solid line in FIG. 7 is obtained. That is, a "jump-in" output A is generated in an initial stage of a braking operation, and then the input force increases linearly in proportion to the output force, and reaches a full-load point B.

Figure 10:
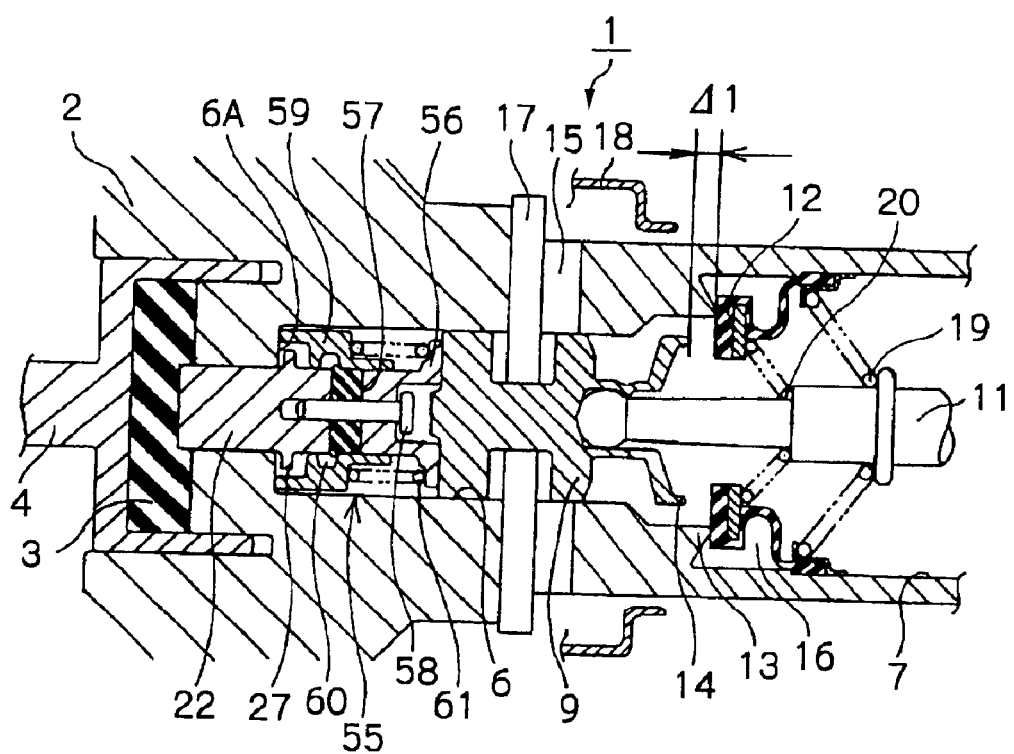
FIG. 10 shows a state of the pneumatic booster of FIG. 8 during rapid braking.

During rapid braking, as shown in FIG. 10, the speed of the plunger 9 moved by the input rod 11, and the speed of the valve body 2 moved by a thrust force of the power piston become different. The movement of the valve body 2 which follows the plunger 9 is delayed, and the sleeve 59 abuts against the end face 6A of the intermediate-diameter bore 6 of the valve body 2 and moves rearward. Consequently, the inner circumferential groove 60 of the sleeve 59 moves to a position on the elastic member 57. In this state, the elastic member 57 which has been compressed is forced into the inner circumferential groove 60 of the sleeve 59, and diametrically enlarged. Therefore, the modulus of elasticity with respect to axial compression of the elastic member 57 becomes low, and accordingly, the axial dimension of the brake assisting mechanism 55 is reduced under the action of the reaction force from the reaction disk 3. Thus, the degree $\Delta 1$ of opening between the seat portion 14 and the poppet seal 12 can be increased.

Figure 11:
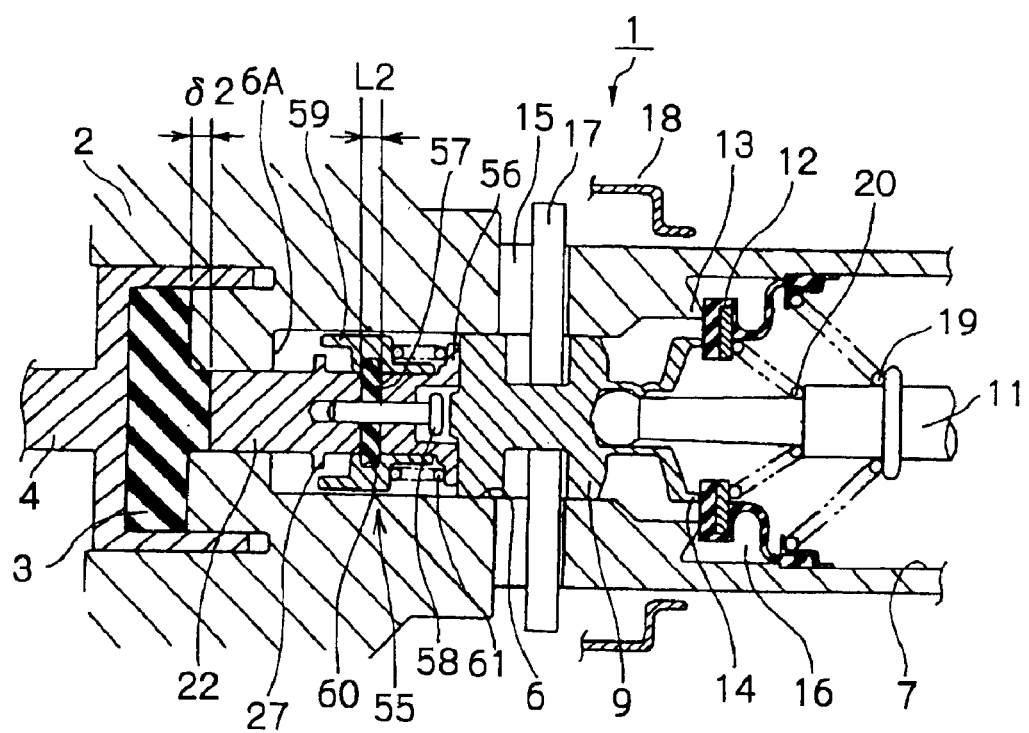
FIG. 11 shows how servo power is generated in the pneumatic booster of FIG. 8, due to a "jump-in" effect during rapid braking.

Consequently, a high pressure differential is generated between the constant pressure chamber and the variable pressure chamber. Under the action of a thrust force generated in the power piston due to this pressure differential, the valve body 2 advances as shown in FIG. 11, and imparts the output rod 4 with servo power. In this instance, the reaction disk 3 is compressed, by means of the valve body 2, by a "jump-in" clearance $\delta 2[\delta 2=\delta 1+ (L1-L2)]$ which is higher than $\delta 1$. Thus, as indicated by the dotted line in FIG. 7, a "jump-in" output D higher than a "jump-in" output A during normal braking can be generated, thus enabling rapid generation of a large braking force.

When the braking force (the input force applied to the input rod 11) is released, lowering of an output of the power piston and a reaction force from the reaction disk 3 occurs, and the elastic member 57, which has been diametrically enlarged, is restored to its original diameter. The sleeve 59 is returned to the reaction rod 22 by the force of the spring 61, and returned to the non-braking position shown in FIG. 8.

Referring to FIGS. 12 to 26, description is made with regard to modified examples of the second embodiment of the present invention. In the following description of these modified examples, the same portions as those in the above second embodiment are designated by the same reference numerals and characters as used in the second embodiment. Only portions that are different from those in the second embodiment are described in detail.

Figure 12:
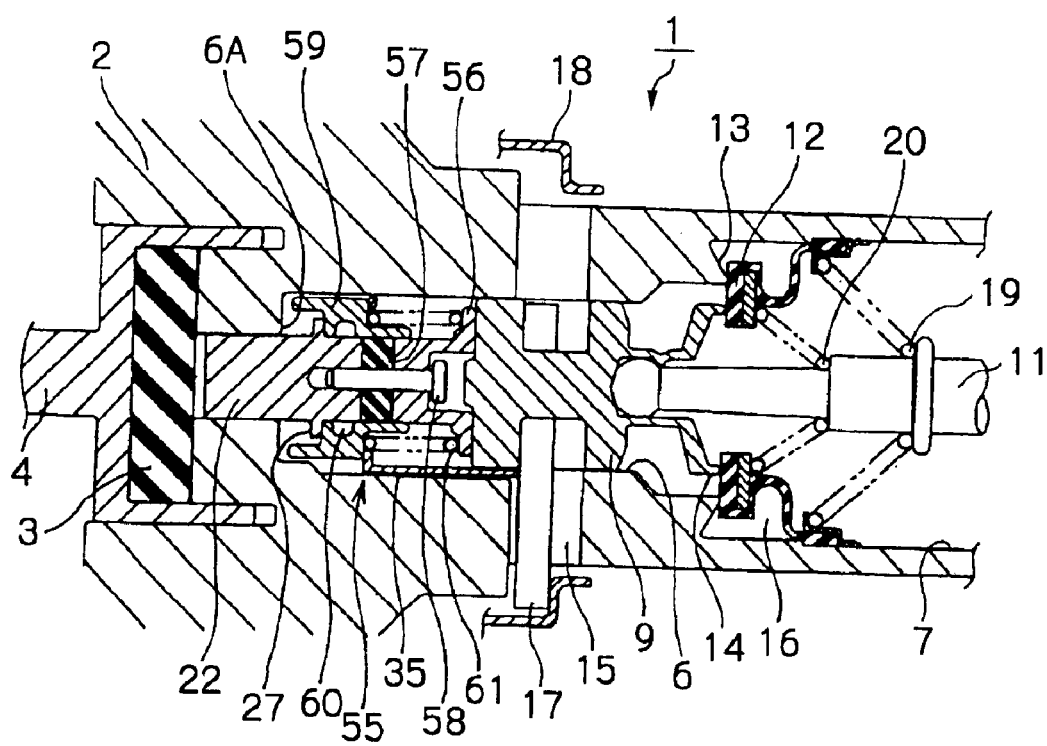
FIG. 12 shows a longitudinal section of an essential part of a pneumatic booster according to a first modified example of the second embodiment of the present invention.

In a first modified example shown in FIG. 12, a return sleeve 35 is provided between the stop key 17 and the sleeve 59. The return sleeve 35 is slidably fitted into the intermediate-diameter bore 6 of the valve body 2. The return sleeve 35 includes a ring-shaped abutment portion which abuts against the sleeve 59. The return sleeve 35 also includes a pair of extension portions rearwardly extending from an outer peripheral portion of the abutment portion. The extension portions extend through axial grooves formed in the inner circumferential surface of the intermediate-diameter bore 6, and abut against the stop key 17. FIG. 12 is a cross-sectional view of the valve body 2 which is cut at a central angle of 90°, so that only one extension portion is shown in FIG. 12. By this arrangement, when a braking force is released after rapid braking, movement of the stop key 17 which abuts against the stop ring 18 is transmitted to the sleeve 59 through the return sleeve 35, so that the sleeve 59 can be reliably returned to the reaction rod 2. In this case, the spring 61 may be eliminated.

Figure 13:
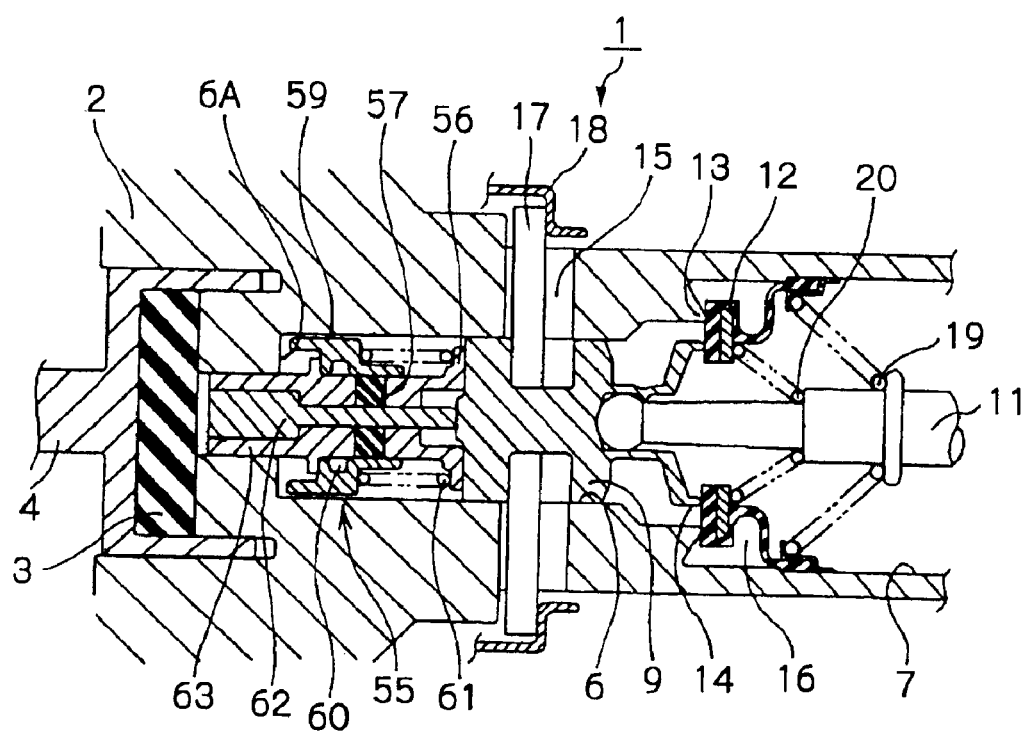
FIG. 13 shows a longitudinal section of an essential part of a pneumatic booster according to a second modified example of the second embodiment of the present invention.
Figure 14:
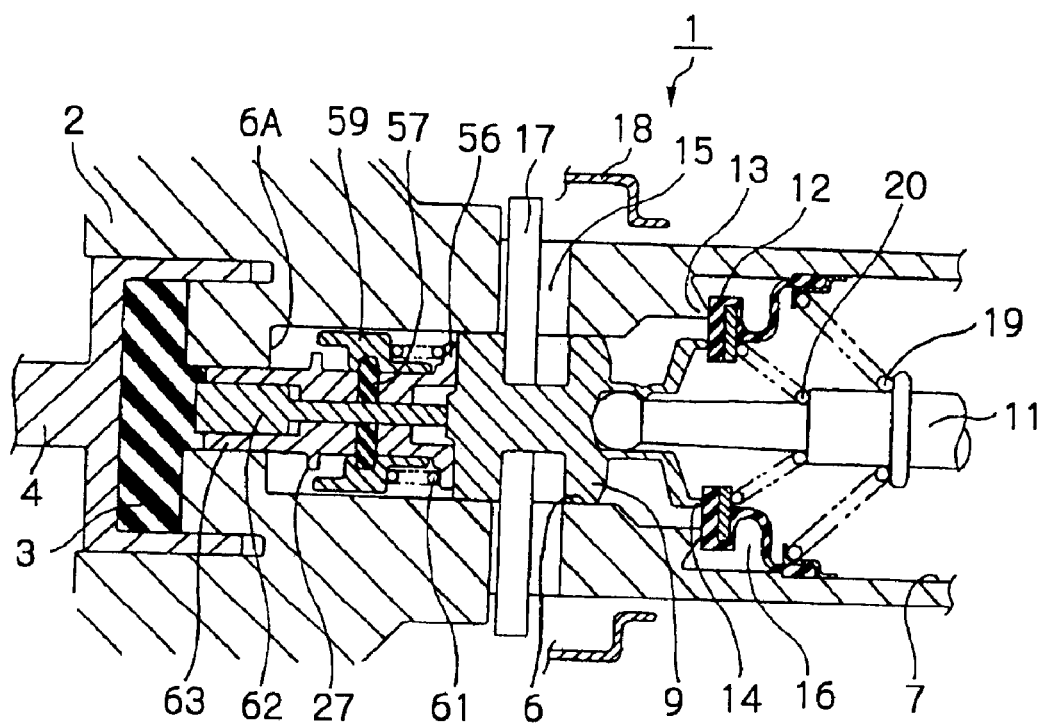
FIG. 14 shows how servo power is generated in the pneumatic booster of FIG. 13, due to a "jump-in" effect during rapid braking.

In a second modified example shown in FIG. 13, differing from FIG. 8, the pin 58 is eliminated from the brake assisting mechanism 55, and the reaction rod 22 is divided into an inner rod 62 and an outer rod 63 which are slidably movable relative to each other. The inner rod 62 extends through the elastic member 57 and the holder 56, and directly abuts against the plunger 9. By this arrangement, as shown in FIG. 14, during rapid braking, only the outer rod 63 moves rearward due to compression of the elastic member 57. Accordingly, a reaction force transmitted from the reaction disk 3 through the inner rod 62 to the plunger 9 becomes small. This provides the same effect as exerted by creating a large "jump-in" clearance, and characteristics as indicated in FIG. 7 can be obtained.

Figure 15:
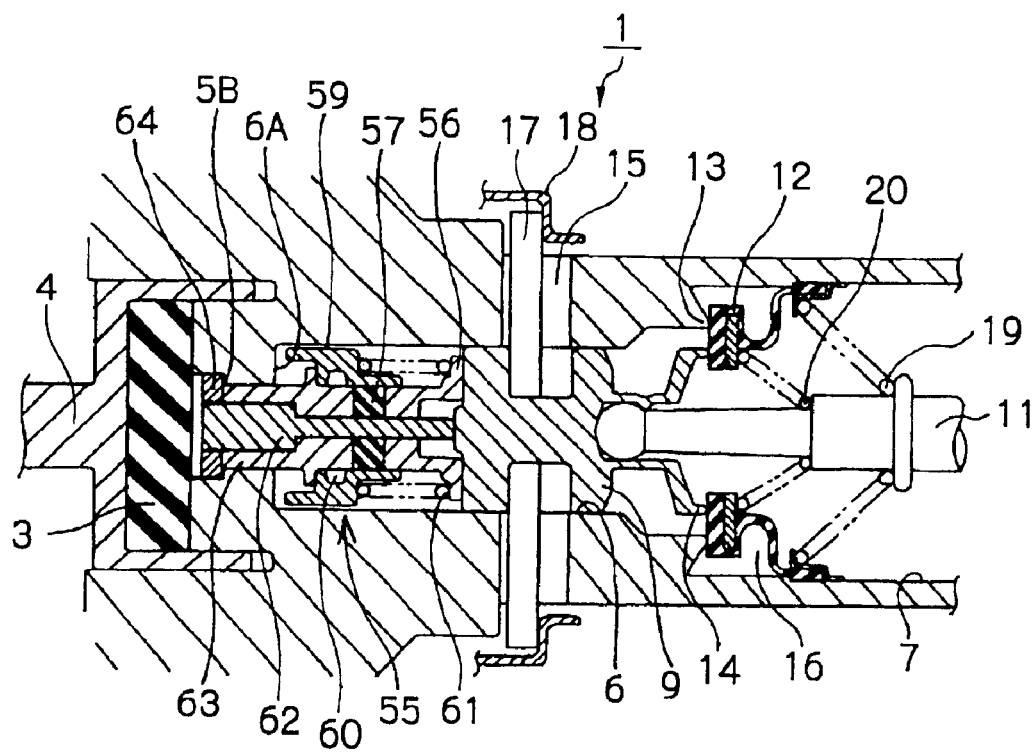
FIG. 15 shows a longitudinal section of an essential part of a pneumatic booster according to a third modified example of the second embodiment of the present invention.
Figure 16:
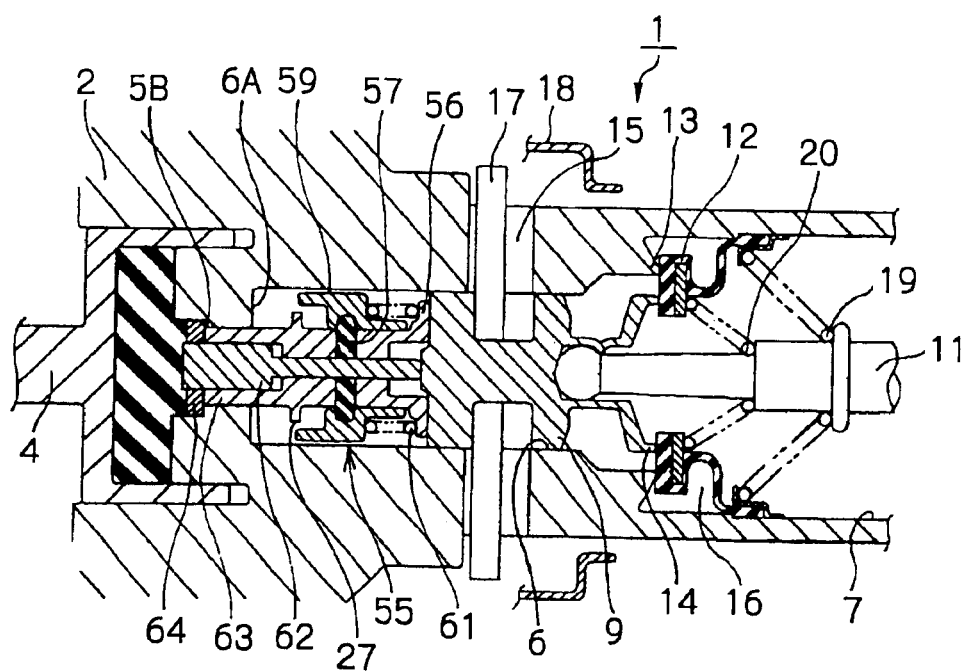
FIG. 16 shows how servo power is generated in the pneumatic booster of FIG. 15, due to a "jump-in" effect during rapid braking.
Figure 17:
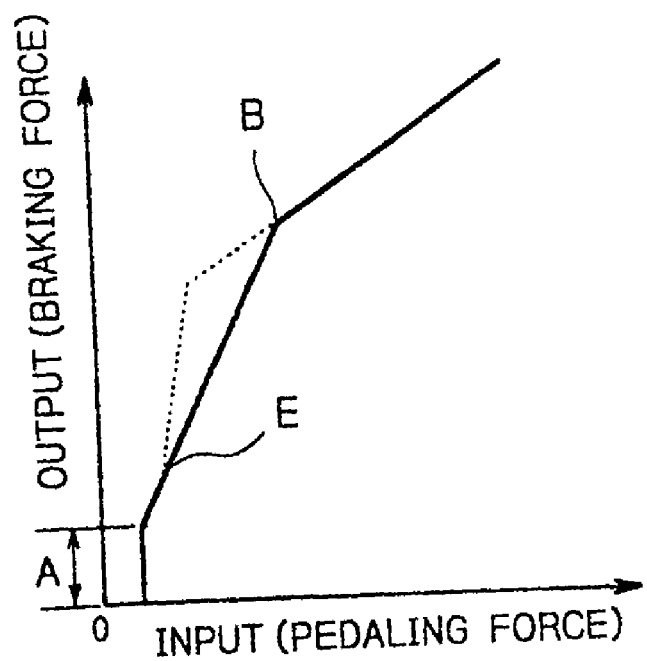
FIG. 17 is a graph indicating the relationship between an input force and an output force in the pneumatic booster of FIG. 15.
Figure 18:
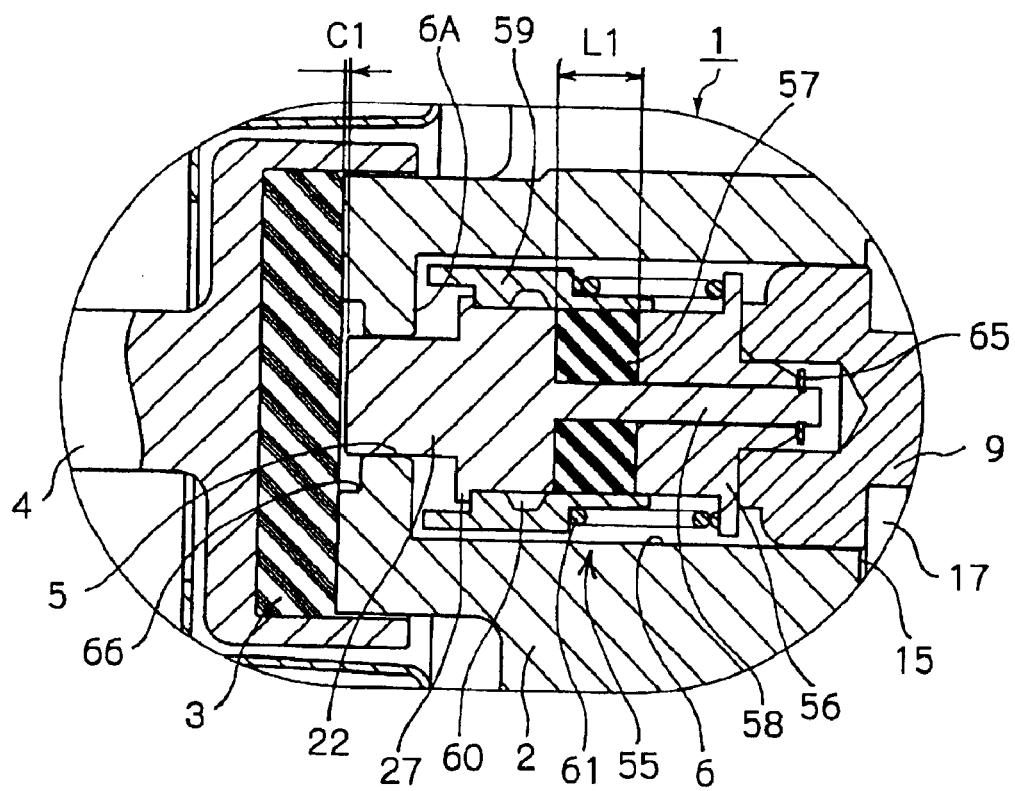
FIG. 18 shows a longitudinal section of an essential part of a pneumatic booster according to a forth modified example of the second embodiment of the present invention.

In a third modified example shown in FIG. 15, differing from the second modified example shown in FIG. 13, an annular ratio plate 64 having a larger diameter than the outer rod 63 is provided between the outer rod 63 and the reaction disk 3, and a slight gap (not shown) is formed between the ratio plate 64 and a shoulder portion 5B of the small-diameter bore 5 of the valve body 2, which abuts against the ratio plate 64. By this arrangement, as shown in FIG. 16, during rapid braking, when the outer rod 63 moves rearward due to compression of the elastic member 57, the reaction force transmitted from the reaction disk 3 to the ratio plate 64 is transmitted through the shoulder portion 5B to the valve body 2. In this state, only the reaction force transmitted from the reaction disk 3 to the inner rod 62 is transmitted to the plunger 9. Thus, a braking force having characteristics indicated by a broken line in FIG. 17 is generated, thus enabling rapid generation of a large braking force. In FIG. 17, a solid line indicates normal braking force characteristics. It should be noted that a pedaling force required in a normal braking operation is also required during rapid braking until a boosting ratio increases at a point E in FIG. 17. This is because a certain load must be applied to force the elastic member 57 into the inner circumferential groove 60 of the sleeve 59.

Next, a fourth modified example of the second embodiment is described, referring to FIGS. 18 to 21 and FIG. 25. As shown in FIGS. 18 to 21, in the forth modified example, differing from the second embodiment shown in FIGS. 8 to 11, the pin 58 is formed integrally with the reaction rod 22, and the reaction rod 22 and the holder 56 are connected by means of a snap ring 65. Further, a relieving portion 66 (a recess) for accommodating the reaction disk 3 pressed by the valve body 2 is formed at the edge of the inner circumferential surface of the small-diameter bore 5 of the valve body 2, so as to provide a so-called 2-ratio type pneumatic booster having a 2-stage boosting ratio.

Figure 19:
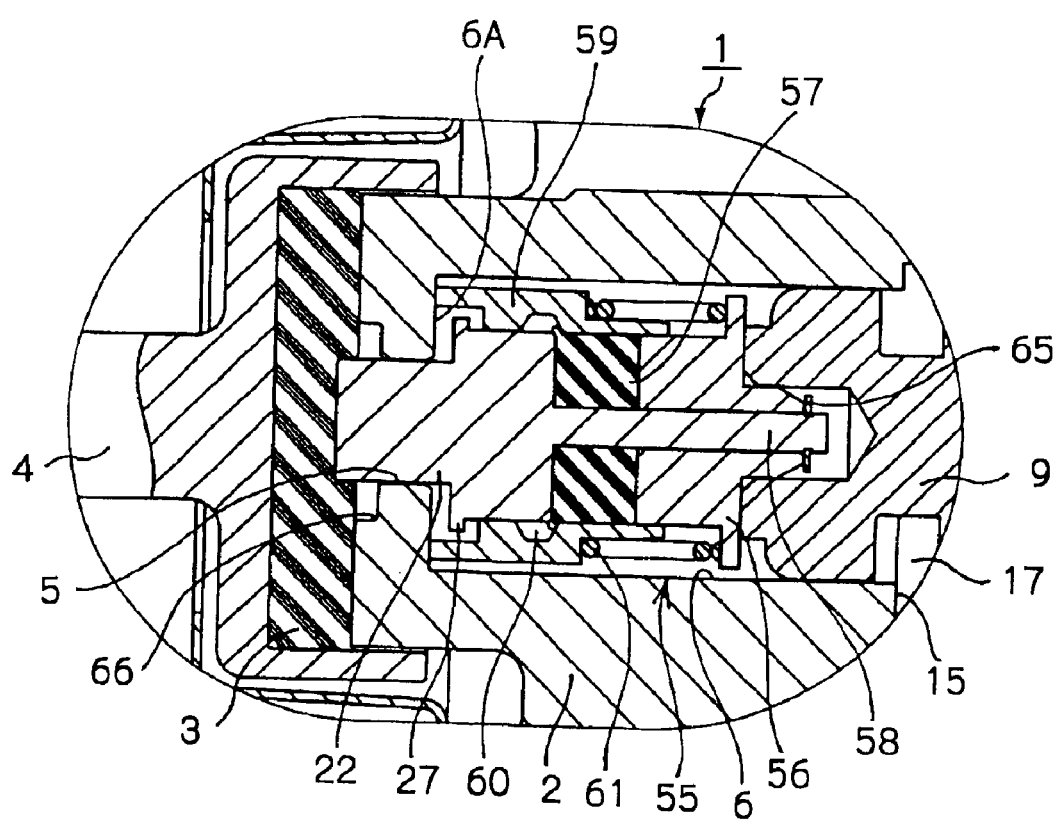
FIG. 19 shows a state of operation of the pneumatic booster of FIG. 18 having an initial boosting ratio during normal braking.

With this arrangement, as is the case with the above second embodiment, the brake assisting mechanism 55 does not contract during normal braking, as shown in FIG. 19. By movement of the plunger 9 due to the input rod 11, atmospheric air is introduced into the variable pressure chamber, and a thrust force generated in the power piston due to a pressure differential between the constant pressure chamber and the variable pressure chamber is applied through the reaction disk 3 to the output rod 4, to thereby generate servo power. A reaction force applied through the output rod 4 to the reaction disk 3 is partly transmitted through the reaction rod 22 and the elastic member 57 to the input rod 11.

Figure 20:
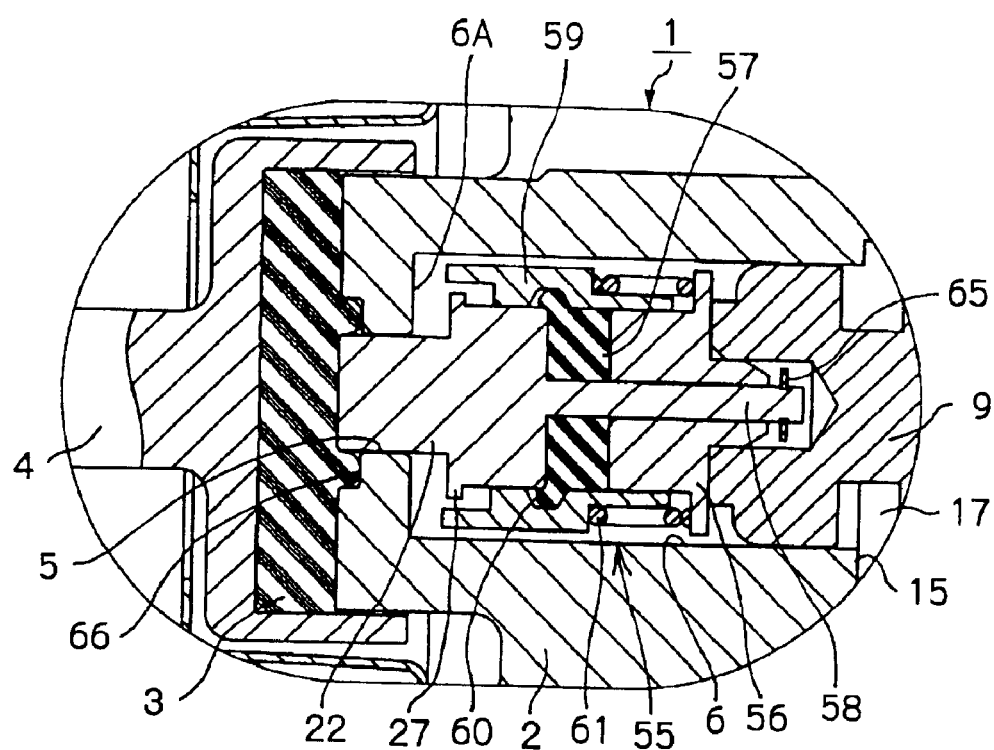
FIG. 20 shows a state of operation of the pneumatic booster of FIG. 18 when a boosting ratio has changed during normal braking.

When the input force applied to the input rod 11 increases to a certain extent, due to the reaction force from the output rod 4, as shown in FIG. 20, the reaction disk 3 expands and fills an inside of the relieving portion 66. Consequently, the pressure-receiving area of the valve body 2 relative to the reaction disk 3 increases. By this arrangement, a boosting ratio increases as is indicated by an arrow ① in FIG. 25, and so-called 2-ratio type servo power is generated.

Figure 21:
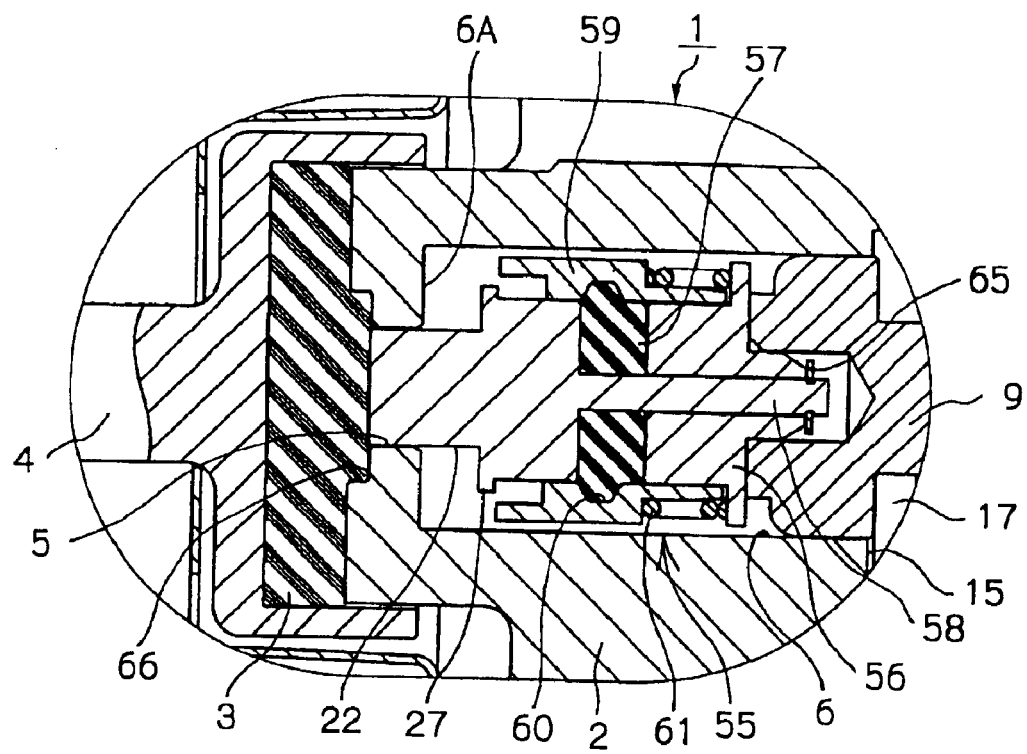
FIG. 21 shows a state of operation of the pneumatic booster of FIG. 18 during rapid braking.

During rapid braking, as shown in FIG. 21, the sleeve 59 moves, and the brake assisting mechanism 55 contracts due to compression of the elastic member 57. Consequently, a "jump-in" output is generated, thus rapidly generating a large braking force. Thus, as indicated by an arrow ② in FIG. 25, a braking force having characteristics combining a "jump-in" output with 2-ratio type servo power is generated, thus ensuring rapid generation of a desired braking force.

A fifth modified example of the second embodiment is described below, referring to FIGS. 22 to 24 and FIG. 26. The same portions as those in the fourth modified example are designated by the same reference numerals and characters as used in the fourth modified example. Only portions that are different from those in the fourth modified example are described in detail.

Figure 22:
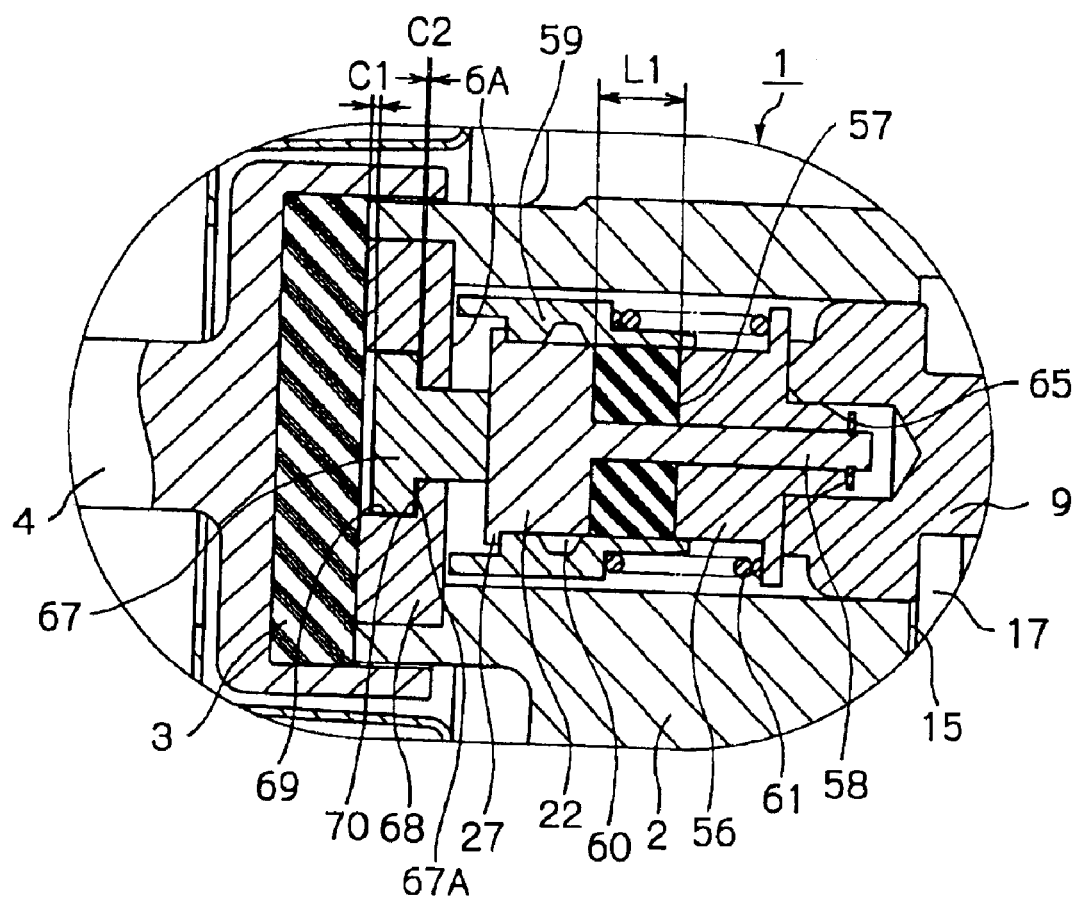
FIG. 22 shows a longitudinal section of an essential part of a pneumatic booster according to a fifth modified example of the second embodiment of the present invention.
Figure 23:
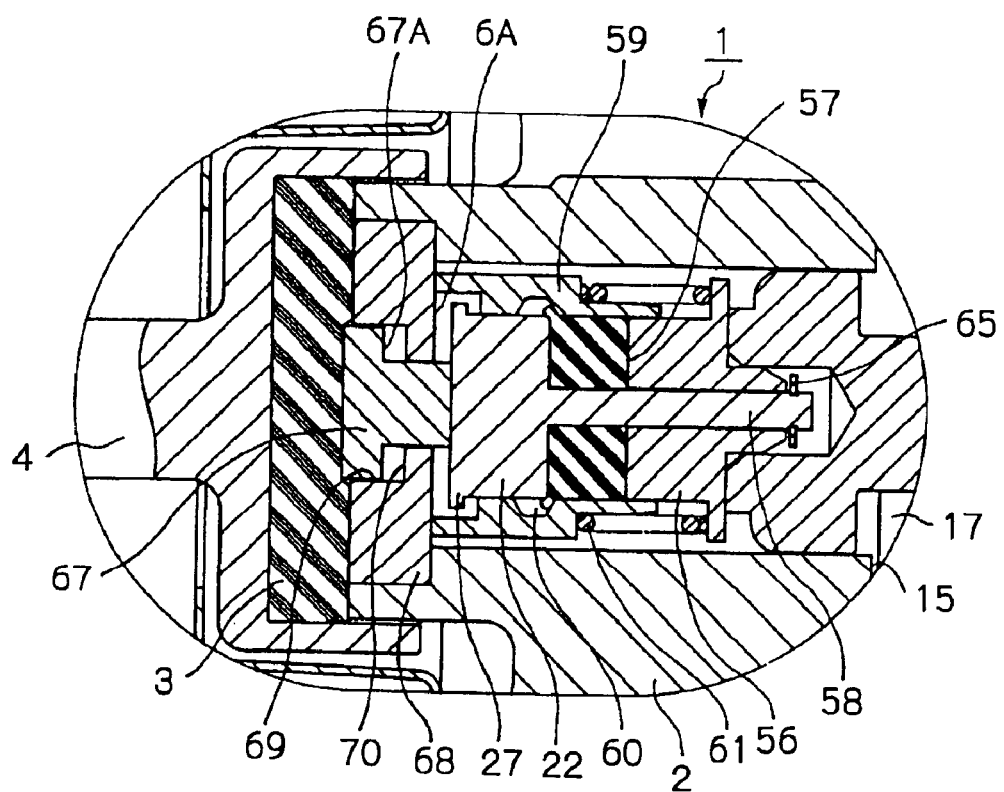
FIG. 23 shows a state of operation of the pneumatic booster of FIG. 22 during normal braking.
Figure 24:
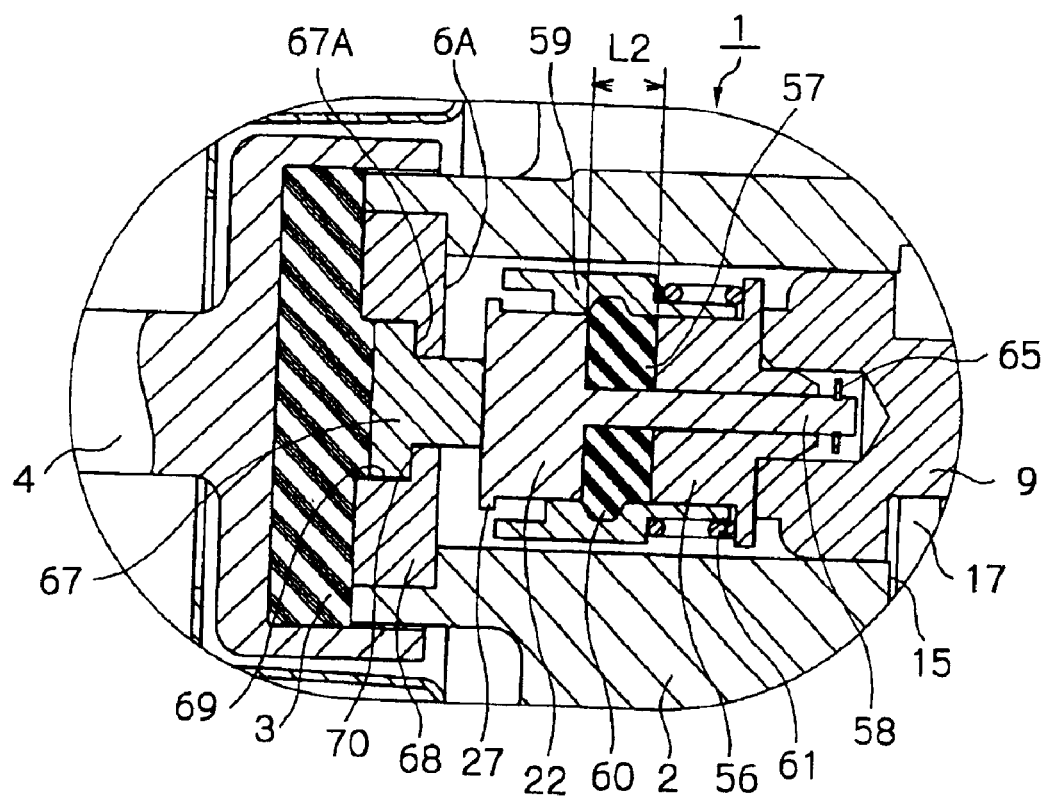
FIG. 24 shows a state of operation of the pneumatic booster of FIG. 22 during rapid braking.
Figure 25:
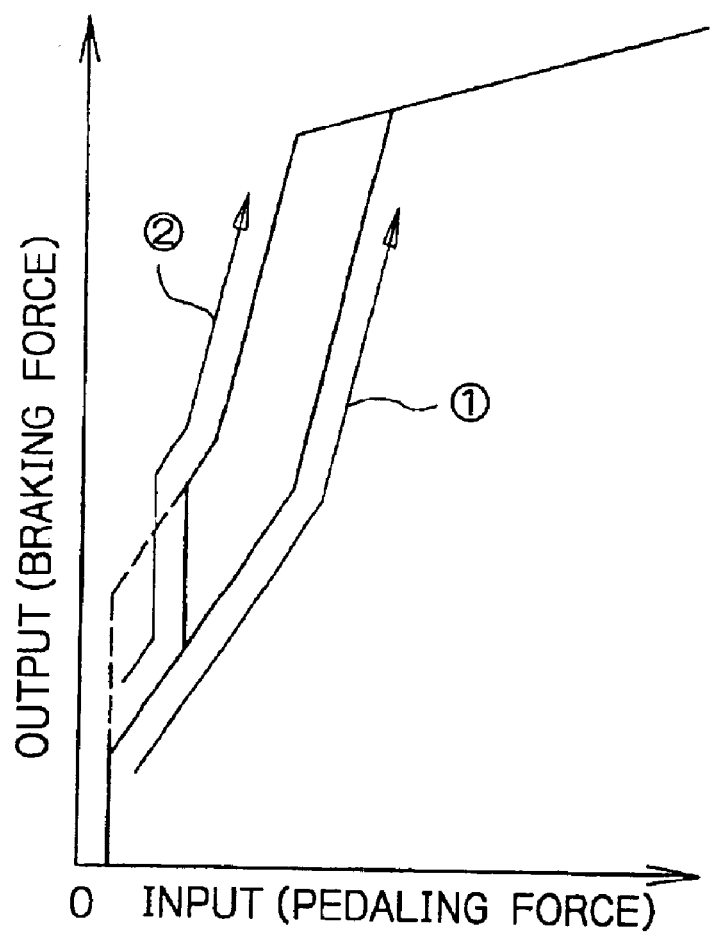
FIG. 25 is a graph indicating the relationship between an input force and an output force in the pneumatic booster of FIG. 18.
Figure 26:
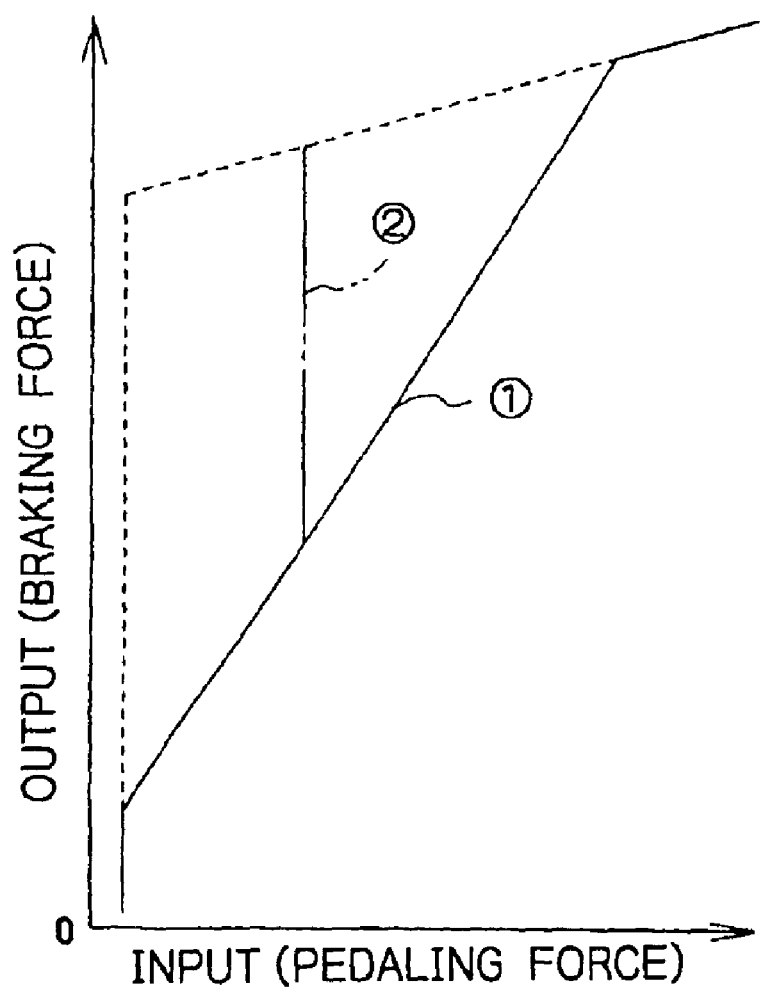
FIG. 26 is a graph indicating the relationship between an input force and an output force in the pneumatic booster of FIG. 22.
Figure 27:
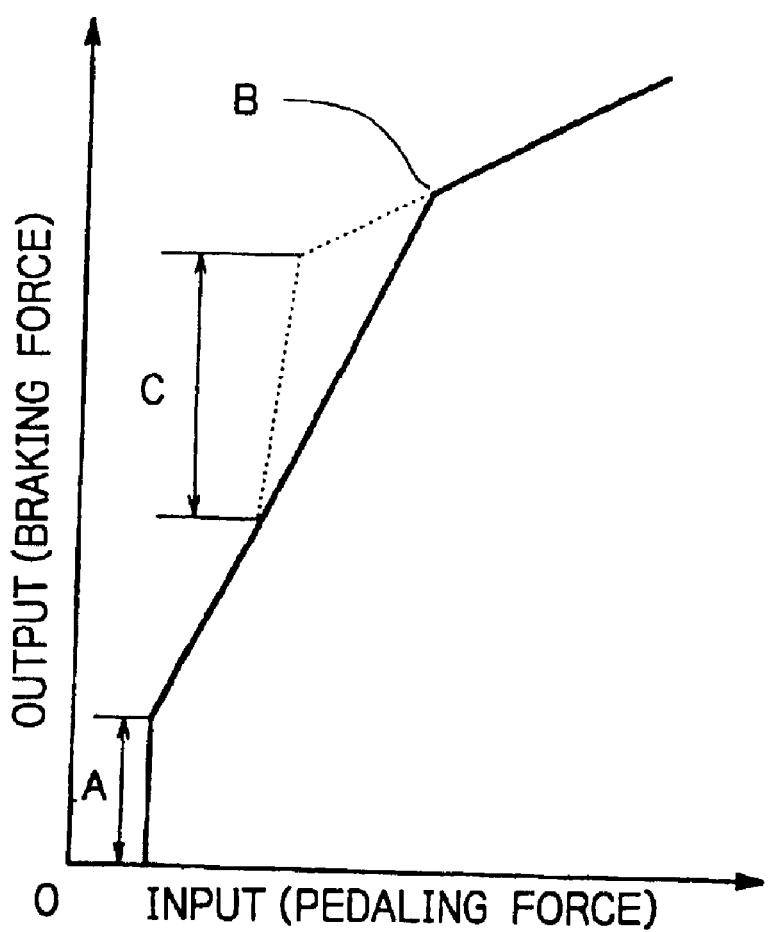
FIG. 27 is a graph indicating the relationship between an input force and an output force in a conventional pneumatic booster comprising a brake assisting mechanism.

As shown in FIGS. 22 to 24, the fifth modified example differs from the fourth modified example in that a reaction plate 67 is provided between the reaction rod 22 and the reaction disk 3. The reaction plate 67 is T-shaped, and is slidably fitted into a stepped bore 69 of a plate 68 attached to a forward end portion of the valve body 2. A small-diameter end portion of the reaction plate 67 abuts against the reaction rod 22, and a large-diameter end portion of the reaction plate 67 is adapted to abut against the reaction disk 3, with a "jump-in" clearance Cl. Further, a retracted position of the reaction plate 67 is limited by abutment against a stepped portion 70 of the stepped bore 69. In a non-braking position (a state shown in FIG. 22), a clearance C2 is formed between the stepped portion 70 and a face 67A of the reaction plate 67 facing the stepped portion 70. The clearance C2 is a value smaller than a length (L1−L2) of the brake assisting mechanism 55 when it is contracted due to compression of the elastic member 57 during rapid braking, which is described later [L2 indicates an axial length of the elastic member 57 in a compressed state (see FIG. 24)].

By this arrangement, during normal braking, as shown in FIG. 23, the brake assisting mechanism 55 does not contract. By movement of the plunger 9 due to the input rod 11, atmospheric air is introduced into the variable pressure chamber, and a thrust force generated in the power piston due to a pressure differential between the constant pressure chamber and the variable pressure chamber is applied through the reaction disk 3 to the output rod 4, to thereby generate servo power. A reaction force applied through the output rod 4 to the reaction disk 3 is partly transmitted to the input rod 11 through the reaction plate 67, the reaction rod 22 and the elastic member 57. Thus, as indicated by ① in FIG. 26, an output force (a braking force) is generated, which increases linearly in proportion to an input force (a pedaling force).

During rapid braking, as shown in FIG. 24, the sleeve 59 moves, and the elastic member 57 is compressed, to thereby contract the brake assisting mechanism 55. Consequently, a "jump-in" output is generated and a large braking force is rapidly generated. In this instance, as the output force (the braking force) increases, the reaction plate 67 is pressed and moved rearward by the reaction disk 3, and abuts against the stepped portion 70 of the plate 68. Consequently, the reaction force from the reaction disk 3 is fully transmitted to the valve body 2 and not transmitted to the plunger 9. Therefore, a pedaling force can be markedly reduced and, as indicated by ② in FIG. 26, the output force (the braking force) jumps to a full-load point indicated by a broken line in FIG. 26. Thus, during rapid braking, rapid generation of a desired braking force can be ensured. Since a braking force jumps to a full-load point during rapid braking, it is preferred to use an anti-lock brake apparatus in combination with this pneumatic booster.

As has been described in detail, in the pneumatic booster of the present invention, when an input force is applied to the input rod at a high rate, the speed of the plunger and the speed of the valve body moved by a thrust force of the power piston become different. Due to a difference in speed between the plunger and the valve body, an amount of movement of the plunger relative to the valve body reaches a predetermined level, resulting in contraction of the brake assisting mechanism. Consequently, the amount of movement of the plunger further increases, thus increasing the degree of opening of the valve means and hence increasing an output force. Thus, a large braking force can be rapidly generated while reducing a pedaling force, and a braking ability in the event of an emergency can be improved.

In one embodiment of the pneumatic booster of the present invention, when the speed or amount of movement of the plunger relative to the valve body reaches the predetermined level, the balls shift from a position between the reaction rod and the plunger rod due to relative movement between the sleeve and the plunger rod. Consequently, the reaction rod and the plunger rod move towards each other, thus contracting the brake assisting mechanism.

In another embodiment of the pneumatic booster of the present invention, when the speed or amount of movement of the plunger relative to the valve body reaches the predetermined level, compression of the elastic member is permitted by using the control means, and contraction of the brake assisting mechanism is effected by compression of the elastic member.

In a further embodiment of the pneumatic booster of the present invention, when the speed or amount of movement of the plunger relative to the valve body reaches the predetermined level, the balls are moved to an allowable position by the control means, and the valve body is moved in a valve-opening direction, thus increasing the degree of opening of the valve means.

In a further embodiment of the pneumatic booster of the present invention, when the reaction member expands into the recess under the action of a reaction force from the output rod, the pressure-receiving area of the valve body relative to the reaction member increases, to thereby change a boosting ratio.

In a further embodiment of the pneumatic booster of the present invention, when the reaction force from the reaction member becomes large and the reaction plate abuts against the valve body, the reaction force from the reaction member is transmitted through the reaction plate to the valve body. Therefore, the reaction force transmitted to the input rod becomes small, thus reducing a pedaling force.

In a further embodiment of the pneumatic booster of the present invention, when an input force is applied to the input rod at a high rate, the speed of the plunger and the speed of the valve body moved by a thrust force of the power piston become different. An amount of movement of the plunger relative to the valve body reaches a predetermined level, and the valve body is moved in a valve-opening direction by the brake assisting mechanism, thus increasing the degree of opening of the valve means and hence increasing an output force. Thus, a large braking force can be rapidly generated while reducing a pedaling force, and a braking ability in the event of an emergency can be improved.

What is claimed is:

1. A pneumatic booster in which a housing is divided into a constant pressure chamber and a variable pressure chamber by a power piston, the power piston being connected to a valve body, and a plunger provided inside the valve body is movable by an input rod, to thereby open a valve means to introduce a working fluid into the variable pressure chamber, thus generating a pressure differential between the constant pressure chamber and the variable pressure chamber, wherein a thrust force generated in the power piston due to the pressure differential is applied through a reaction member to an output rod, and a reaction force of the output rod applied to the reaction member is partly transmitted to the input rod, wherein a contractible brake assisting mechanism is provided between the plunger and the reaction member and comprises:

a sleeve slidably guided in the valve body;

a plunger rod inserted in the sleeve and connected to the plunger;

a reaction rod provided to face the reaction member and in axial alignment with the plunger rod so that associated ends of the reaction rod and the plunger rod face each other; and balls provided between the plunger rod and the reaction rod inside the sleeve, wherein when the speed or the amount of movement of the plunger relative to the valve body reaches a predetermined level, due to relative movement between the sleeve and the plunger rod, the balls shift from a position between the reaction rod and the plunger rod in a radial direction of the plunger rod, to thereby allow said ends of the reaction rod and the plunger rod to abut against each other to shorten the combination of the reaction rod and the plunger rod.

2. A pneumatic booster according to claim 1, wherein the sleeve is biased towards the reaction member by means of a bias member provided between the sleeve and the plunger, and wherein the sleeve is adapted to abut against the valve body when the speed or the amount of movement of the plunger relative to the valve body reaches the predetermined level.

3. A pneumatic booster according to claim 1, further comprising a ratio plate for transmitting the reaction force from the reaction member towards the input rod, wherein when the reaction force from the reaction member becomes large, the ratio plate abuts against the valve body.

4. A pneumatic booster in which a housing is divided into a constant pressure chamber and a variable pressure chamber by a power piston, the power piston being connected to a valve body, and a plunger provided inside the valve body is movable by an input rod, to thereby open a valve means to introduce a working fluid into the variable pressure chamber, thus generating a pressure differential between the constant pressure chamber and the variable pressure chamber, wherein a thrust force generated in the power piston due to the pressure differential is applied through a reaction member to an output rod, and a reaction force of the output rod applied to the reaction member is partly transmitted to the input rod, wherein a contractible brake assisting mechanism is provided between the plunger and the reaction member and comprises:

a reaction rod facing the reaction member;

an elastic member provided between the reaction rod and the plunger; and a control means adapted to normally limit compression of the elastic member in a direction of movement of the plunger, and permit compression of the elastic member in the direction of movement of the plunger when the speed or the amount of movement of the plunger relative to the valve body reaches a predetermined level, said control means comprising a sleeve slidably provided on an outer circumferential surface of the elastic member, the sleeve including a groove formed in an inner circumferential surface thereof, the groove being adapted to accommodate a diametrically expanded portion of the elastic member, which is formed as the elastic member is compressed in the direction of movement of the plunger when the speed or the amount of movement of the plunger relative to the valve body reaches the predetermined level.

5. A pneumatic booster according to claim 4, wherein the sleeve is biased towards the reaction member by means of a bias member, and wherein the sleeve is adapted to abut against the valve body when the speed or the amount of movement of the plunger relative to the valve body reaches the predetermined level.

6. A pneumatic booster according to claim 5, wherein said reaction rod has a flange portion and said sleeve is detained by the reaction rod through the engagement between the sleeve and the flange portion.

7. A pneumatic booster according to claim 5, wherein the bias member engages a holder provided separately from the plunger and provided in contact with the plunger, and a connecting member is provided so as to connect the holder, the elastic member and the reaction rod in a manner such that a region between the holder and the reaction rod is contractible.

8. A pneumatic booster according to claim 4, wherein a pressure-receiving surface of the valve body for the reaction member includes a recess, and an effective area of the pressure-receiving surface of the valve body for the reaction member is increased by allowing expansion of the reaction member into the recess.

9. A pneumatic booster according to claim 4, further comprising a reaction plate for transmitting the reaction force from the reaction member towards the input rod, wherein when the reaction force from the reaction member becomes large, the reaction plate transmits the reaction force from the reaction member to the valve body.

10. A pneumatic booster according to claim 9, wherein the reaction plate transmits the reaction force from the reaction member to the valve body by abutting against a member attached to the valve body.

11. A pneumatic booster according to claim 10, wherein said member attached to the valve body is a plate which has a stepped bore, wherein said reaction plate is slidably fitted in the stepped bore.

12. A pneumatic booster according to claim 4, wherein said reaction rod is divided into an inner rod and an outer rod so that the outer rod only retracts relative to the inner rod when the elastic member is compressed.

13. A pneumatic booster according to claim 12, wherein a ratio plate having a larger diameter than the outer rod is provided between the outer rod and the reaction member and received in a stepped bore in the valve body leaving a gap between the ratio plate and the stepped shoulder of the stepped bore so that when the ratio plate retracts by a reaction force imparted from the reaction member, the ratio plate abuts against the stepped shoulder to impart part of the reaction force.

14. A pneumatic booster in which a housing is divided into a constant pressure chamber and a variable pressure chamber by a power piston, the power piston being connected to a valve body, and a plunger provided inside the valve body is movable by an input rod, to thereby open a valve means to introduce a working fluid into the variable pressure chamber, thus generating a pressure differential between the constant pressure chamber and the variable pressure chamber, wherein a thrust force generated in the power piston due to the pressure differential is applied through a reaction member to an output rod, and a reaction force of the output rod applied to the reaction member is partly transmitted to the input rod, wherein a contractible brake assisting mechanism is provided between the plunger and the reaction member, the brake assisting mechanism being adapted to contract when a speed or an amount of movement of the plunger relative to the valve body reaches a predetermined level and wherein a pressure-receiving surface of the valve body for the reaction member includes a recess, and an effective area of the pressure-receiving surface of the valve body for the reaction member is increased by allowing expansion of the reaction member into the recess.

15. A pneumatic booster according to claim 14, wherein the brake assisting mechanism comprises:

a reaction rod facing the reaction member;

an elastic member provided between the reaction rod and the plunger; and a control means adapted to normally limit compression of the elastic member in a direction of movement of the plunger, and permits compression of the elastic member in the direction of movement of the plunger by allowing its radial deformation when the speed or the amount of movement of the plunger relative to the valve body reaches the predetermined level.

16. A pneumatic booster according to claim 15, wherein said control means comprises a sleeve slidably provided on an outer circumferential surface of the elastic member and including a groove formed in an inner circumferential surface thereof, the sleeve being biased towards the reaction member by means of a bias member, and wherein the sleeve is adapted to abut against the valve body when the speed or the amount of movement of the plunger relative to the valve body reaches the predetermined level.

17. A pneumatic booster according to claim 16, wherein the bias member engages a holder provided separately from the plunger and provided in contact with the plunger, and a connecting member is provided so as to connect the holder, the elastic member and the reaction rod in a manner such that a region between the holder and the reaction rod is contractible.

18. A pneumatic booster in which a housing is divided into a constant pressure chamber and a variable pressure chamber by a power piston, the power piston being connected to a valve body, and a plunger provided inside the valve body is movable by an input rod, to thereby open a valve means to introduce a working fluid into the variable pressure chamber, thus generating a pressure differential between the constant pressure chamber and the variable pressure chamber, wherein a thrust force generated in the power piston due to the pressure differential is applied through a reaction member to an output rod, and a reaction force of the output rod applied to the reaction member is partly transmitted to the input rod, wherein a contractible brake assisting mechanism is provided between the plunger and the reaction member and comprises:

a reaction rod facing the reaction member; and an elastic member provided between the reaction rod and the plunger, said elastic member being situated so that it is normally restrained from being compressed in a direction of movement of the plunger but compresses in the direction of movement of the plunger by radially deforming when the speed or the amount of movement of the plunger relative to the valve body reaches a predetermined level.

19. A pneumatic booster according to claim 18, wherein said contractible brake assisting mechanism comprises a sleeve slidably provided on an outer circumferential surface of the elastic member and including a groove formed in an inner circumferential surface thereof, the sleeve being biased towards the reaction member by means of a bias member, and wherein the sleeve is adapted to abut against the valve body when the speed or the amount of movement of the plunger relative to the valve body reaches the predetermined level.

20. A pneumatic booster according to claim 19, wherein said reaction rod has a flange portion and said sleeve is detained by the reaction rod through the engagement between the sleeve and the flange portion.

21. A pneumatic booster according to claim 19, wherein the bias member engages a holder provided separately from the plunger and provided in contact with the plunger, and a connecting member is provided so as to connect the holder, the elastic member and the reaction rod in a manner such that a region between the holder and the reaction rod is contractible.

* * * * *